US009596567B2

(12) United States Patent
Thornycroft et al.

(10) Patent No.: US 9,596,567 B2
(45) Date of Patent: Mar. 14, 2017

(54) DETERMINING A LOCATION OF A TARGET WIRELESS DEVICE

(71) Applicant: Aruba Networks, Inc., Sunnyvale, CA (US)

(72) Inventors: Peter Thornycroft, Los Altos, CA (US); Neal Castagnoli, Morgan Hill, CA (US); Gautam Bhanage, Sunnyvale, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 0 days.

(21) Appl. No.: 14/805,247

(22) Filed: Jul. 21, 2015

(65) Prior Publication Data
US 2016/0100287 A1    Apr. 7, 2016

Related U.S. Application Data

(63) Continuation of application No. 14/805,174, filed on Jul. 21, 2015.
(Continued)

(51) Int. Cl.
H04W 4/02 (2009.01)
G01S 5/00 (2006.01)
(Continued)

(52) U.S. Cl.
CPC ........... H04W 4/023 (2013.01); G01S 5/0036 (2013.01); H04W 40/244 (2013.01);
(Continued)

(58) Field of Classification Search
CPC ............. H04W 4/023; H04W 72/0406; H04W 40/244; H04W 88/021; H04W 88/08; H04W 84/02
See application file for complete search history.

(56) References Cited

U.S. PATENT DOCUMENTS

2012/0314663 A1   12/2012 Dwivedi et al.
2013/0316730 A1*  11/2013 Ding ............... H04W 4/02
                                                    455/456.1
(Continued)

OTHER PUBLICATIONS

Thonrycoft, P., et al., "Final Office Action cited in U.S. Appl. No. 14/805,174", mailed Jul. 29, 2016; 12 pages.
(Continued)

Primary Examiner — Joseph Dean, Jr.
(74) Attorney, Agent, or Firm — Hewlett Packard Enterprise Patent Department

(57) ABSTRACT

Various techniques and systems are provided for determining a location of a target wireless device. Specifically, various techniques and systems are provided for determining a location of a wireless device using timestamps assigned to communications transmitted between the wireless device and one or more other wireless devices on a same WiFi channel as the wireless device. Implementations describe devices, computer-program products, and methods including transmitting a beacon frame by a network device on a channel of a radio frequency band, receiving a first frame that corresponds to the client device, assigning a first timestamp to the first frame, transmitting a second frame in response to the client device communication, assigning a second timestamp to the second frame, determining a time difference between the first timestamp and the second timestamp, receiving an alternative time difference corresponding to an alternative network device on the channel, and determining a location of the client device using the time difference and the alternative time difference.

15 Claims, 16 Drawing Sheets

Related U.S. Application Data

(60) Provisional application No. 62/060,983, filed on Oct. 7, 2014.

(51) Int. Cl.
| | | |
|---|---|---|
| *H04W 64/00* | (2009.01) | |
| *H04W 40/24* | (2009.01) | |
| *H04W 84/12* | (2009.01) | |
| *H04W 88/02* | (2009.01) | |
| *H04W 88/08* | (2009.01) | |
| *H04W 84/02* | (2009.01) | |

(52) U.S. Cl.
CPC ............ *H04W 64/00* (2013.01); *H04W 84/02* (2013.01); *H04W 84/12* (2013.01); *H04W 88/021* (2013.01); *H04W 88/08* (2013.01)

(56) References Cited

U.S. PATENT DOCUMENTS

| | | | |
|---|---|---|---|
| 2014/0341105 A1* | 11/2014 | Vardhan ................ | H04W 24/02 370/315 |
| 2015/0016375 A1 | 1/2015 | Davis et al. | |
| 2015/0094103 A1* | 4/2015 | Wang .................... | H04W 4/023 455/456.6 |
| 2015/0382143 A1* | 12/2015 | Lindskog .............. | H04W 4/023 455/456.1 |

OTHER PUBLICATIONS

Thonrycroft, P., et al.; "Non-Final Office Action cited in U.S. Appl. No. 14/805,174"; mailed Jan. 25, 2016; 10 pages.

* cited by examiner

DETERMINING A LOCATION OF A TARGET WIRELESS DEVICE

CROSS-REFERENCE TO RELATED APPLICATIONS

This application is a continuation of and claims benefit of U.S. Non-provisional application Ser. No. 14/805,174, filed on Jul. 21, 2015 and titled "DETERMINING A LOCATION OF A TARGET WIRELESS DEVICE," which is a non-provisional of and claims the benefit and priority under 35 U.S.C. §119(e) of U.S. Provisional App. No. 62/060,983, filed on Oct. 7, 2014 and titled "Determining a Location of a Target Wireless Device." These applications are incorporated by reference herein for all purposes.

FIELD

The present disclosure relates to a computer technology for determining a location of a target wireless device. Specifically, various techniques and systems are provided for determining a location of a wireless device using time-stamps assigned to communications transmitted between the wireless device and one or more other wireless devices on a same WiFi channel as the wireless device.

BRIEF SUMMARY

In an embodiment, the present technology includes a computer-implemented method. The method may comprise, for example, transmitting a first frame by a network device on a channel of a radio frequency band, assigning a first timestamp to the frame, wherein the first timestamp includes a time the frame is transmitted, assigning a second timestamp to a second frame, wherein the second frame originates from a client device in response to the first frame and wherein the second timestamp indicates a time that the second frame is received at the network device, determining a time difference between the first timestamp and the second timestamp, receiving an alternative time difference corresponding to an alternative network device, wherein the alternative time difference is based on a time that the alternative network device received the first frame and a time that the alternative network device received the second frame, and determining a location of the client device using the time difference and the alternative time difference.

In another embodiment, the present technology includes a network device. The network device may comprise, for example, one or more processors and a non-transitory computer-readable medium. The computer-readable medium may contain instructions that, when executed by the one or more processors, cause the one or more processors to perform operations. The operations may include transmitting a first frame by a network device on a channel of a radio frequency band, assigning a first timestamp to the frame, wherein the first timestamp includes a time the frame is transmitted, assigning a second timestamp to a second frame, wherein the second frame originates from a client device in response to the first frame and wherein the second timestamp indicates a time that the second frame is received at the network device, determining a time difference between the first timestamp and the second timestamp, receiving an alternative time difference corresponding to an alternative network device, wherein the alternative time difference is based on a time that the alternative network device received the first frame and a time that the alternative network device received the second frame, and determining a location of the client device using the time difference and the alternative time difference.

In another embodiment, the present technology includes a computer-program product. The computer-program product may be tangibly embodied in a non-transitory machine-readable storage medium of a computing device. The non-transitory machine-readable storage medium may include instructions that, when executed by one or more processors, cause the one or more processors to transmit a first frame by a network device on a channel of a radio frequency band, assign a first timestamp to the frame, wherein the first timestamp includes a time the frame is transmitted, assign a second timestamp to a second frame, wherein the second frame originates from a client device in response to the first frame and wherein the second timestamp indicates a time that the second frame is received at the network device, determine a time difference between the first timestamp and the second timestamp, receive an alternative time difference corresponding to an alternative network device, wherein the alternative time difference is based on a time that the alternative network device received the first frame and a time that the alternative network device received the second frame, and determine a location of the client device using the time difference and the alternative time difference.

In an aspect, for example, the method may further comprise receiving a second alternative time difference corresponding to a second alternative network device on the channel, wherein the second alternative time difference is based on a time that the second alternative network device receives the first frame and a time that the second alternative network device received the second frame, and determining a location of the client device using the time difference, the alternative time difference, and the second alternative time difference. In another aspect, for example, the method may further comprise transmitting, by the network device, channel information corresponding to the channel, wherein the channel information facilitates the alternative network device connecting to the channel. In another aspect, for example, the method may further comprise determining that the network device and the alternative network device are connected to the same channel. In another aspect, for example, the method may further comprise assigning the first timestamp to the first frame before the first frame is transmitted, and storing the first timestamp. In another aspect, for example, the method may further comprise transmitting a location query including the time difference and the alternative time difference, and receiving a response to the location query including a location of the client device. In another aspect, for example, the first frame may facilitate the second frame connecting to the channel. In another aspect, for example, the second frame may include an indication that the client device is connected to the channel. The aspects described herein may also be implemented within the network device (e.g. as instructions), computer-program product (e.g. as instructions), or other embodiments described herein.

In another embodiment, the present technology includes a computer-implemented method. The method may comprise, for example, transmitting a beacon frame by a network device on a channel of a radio frequency band, wherein the beacon frame facilitates a client device connecting to the channel, and wherein the client device is associated with the network device, receiving a first frame that corresponds to the client device, assigning a first timestamp to the first frame, wherein the first timestamp includes a time that the first frame is received at the network device, transmitting a second frame in response to the client device communication, assigning a second timestamp to the second frame, wherein the second timestamp includes a time that the network device transmits the second frame, determining a time difference between the first timestamp and the second timestamp, receiving an alternative time difference corresponding to an alternative network device on the channel, wherein the alternative time difference is based on an a time that the alternative network device received the first frame and a time that the alternative network device received the second frame, and determining a location of the client device using the time difference and the alternative time difference.

In another embodiment, the present technology includes a network device. The network device may comprise, for example, one or more processors and a non-transitory computer-readable medium. The computer-readable medium may contain instructions that, when executed by the one or more processors, cause the one or more processors to perform operations. The operations may include transmitting a beacon frame by a network device on a channel of a radio frequency band, wherein the beacon frame facilitates a client device connecting to the channel, and wherein the client device is associated with the network device, receiving a first frame that corresponds to the client device, assigning a first timestamp to the first frame, wherein the first timestamp includes a time that the first frame is received at the network device, transmitting a second frame in response to the client device communication, assigning a second timestamp to the second frame, wherein the second timestamp includes a time that the network device transmits the second frame, determining a time difference between the first timestamp and the second timestamp, receiving an alternative time difference corresponding to an alternative network device on the channel, wherein the alternative time difference is based on an a time that the alternative network device received the first frame and a time that the alternative network device received the second frame, and determining a location of the client device using the time difference and the alternative time difference.

In another embodiment, the present technology includes a computer-program product. The computer-program product may be tangibly embodied in a non-transitory machine-readable storage medium of a computing device. The non-transitory machine-readable storage medium may include instructions that, when executed by one or more processors, cause the one or more processors to transmit a beacon frame by a network device on a channel of a radio frequency band, wherein the beacon frame facilitates a client device connecting to the channel, and wherein the client device is associated with the network device, receive a first frame that corresponds to the client device, assign a first timestamp to the first frame, wherein the first timestamp includes a time that the first frame is received at the network device, transmit a second frame in response to the client device communication, assign a second timestamp to the second frame, wherein the second timestamp includes a time that the network device transmits the second frame, determine a time difference between the first timestamp and the second timestamp, receive an alternative time difference corresponding to an alternative network device on the channel, wherein the alternative time difference is based on an a time that the alternative network device received the first frame and a time that the alternative network device received the second frame, and determine a location of the client device using the time difference and the alternative time difference.

In an aspect, for example, the method may further comprise receiving a second alternative time difference corresponding to a second alternative network device on the channel, wherein the second alternative time difference is based on a time that the second alternative access point receives the first frame and a time that the second alternative access point receives the second frame, and determining a location of the client device using the time difference, the alternative time difference, and the second alternative time difference. In another aspect, the method may further comprise transmitting, by the network device, channel information corresponding to the channel, wherein the channel information facilitates the alternative access point connecting to the channel. In another aspect, the method may further comprise determining that the network device and the alternative network device are connected to the same channel. In another aspect, the client device may be in sleep mode, and transmitting the beacon frame facilitates removing the client device from sleep mode. In another aspect, the method may further comprise transmitting a location query including the time difference and the alternative time difference, and receiving a response to the location query including a location of the client device. In another aspect, the first frame may include an indication that the client device is connected to the channel. The aspects described herein may also be implemented within the network device (e.g. as instructions), computer-program product (e.g. as instructions), or other embodiments described herein.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that although the present system and methods have been specifically disclosed by embodiments and optional features, modification and variation of the concepts herein disclosed may be resorted to by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments are described in detail below with reference to the following figures.

DETAILED DESCRIPTION

Figure 1:
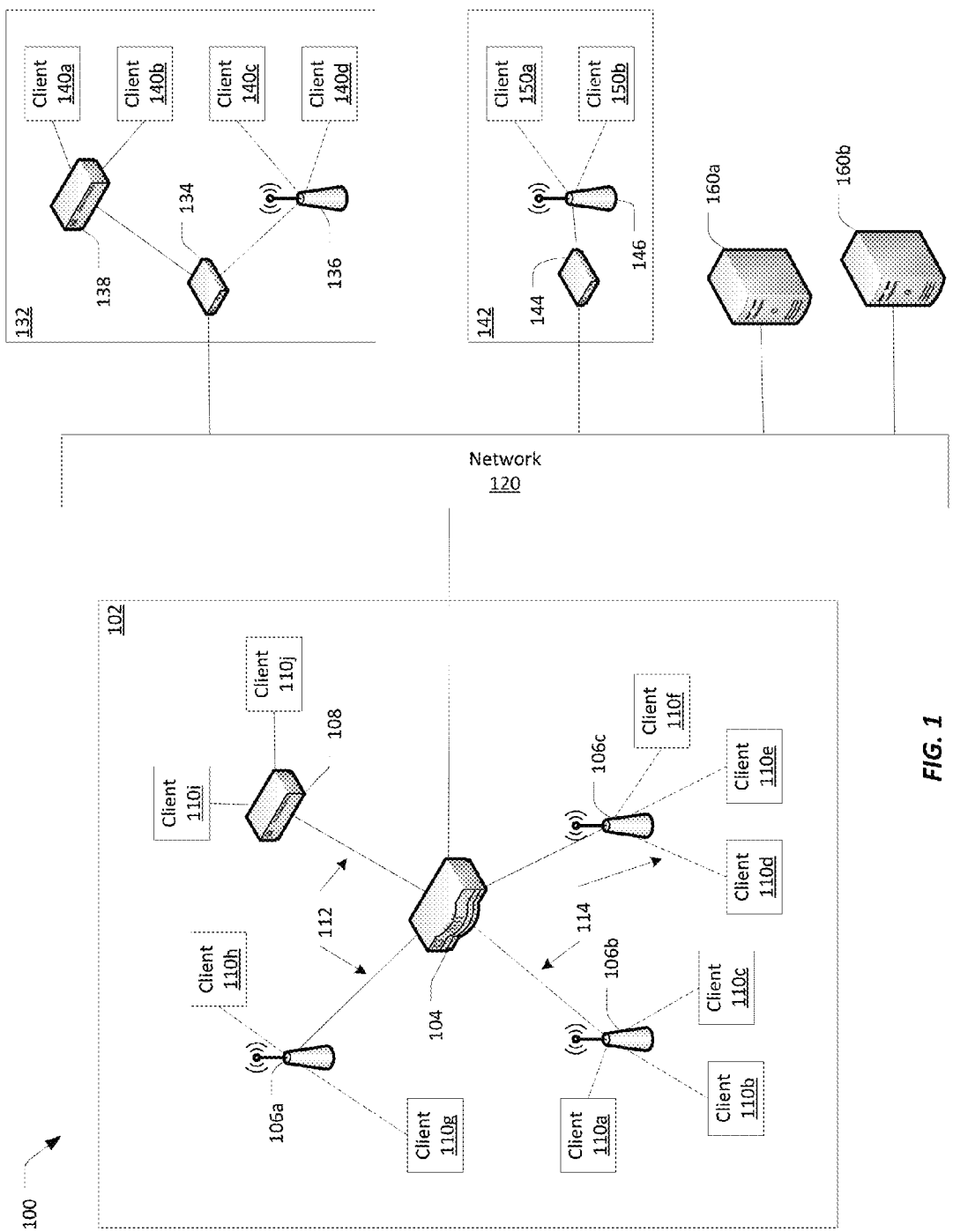
FIG. 1 illustrates one embodiment of a network configuration that may be implemented for systems and methods including a computer technology for determining a location of a target wireless device, according to embodiments of the present technology.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

FIG. 1 illustrates one embodiment of a network configuration 100 that may be implemented for a multi-user organization, such as a business, educational institution, governmental entity, or any other organization having multiple users and possibly multiple physical or geographical sites. The network configuration 100 may include a main office 102 in communication with a network 120. The network configuration 100 may also include one or more remote sites 132, 142, also in communication with the network 120.

The main office 102 may include a primary network, possibly also called a corporate network or a home network. The main office 102 network may be a private network. A private network is a network that may include security and access controls, such that only certain users are authorized to access the private network. Authorized users may include, for example, employees of a company based in the main office 102.

In the illustrated embodiment, the main office 102 includes a controller 104 in communication with the network 120. The controller 104 may provide communication with the network 120 for the main office 102, though it may not be the only point of communication with the network 120 for the main office 102. A single controller 104 is illustrated, though the main office may include multiple controllers and/or multiple communication points with network 120. In some embodiments, the controller 104 communicates with the network 120 through a router (not illustrated). In other embodiments, the controller 104 provides router functionality to the devices in the main office 102.

A controller 104 is operable to configure and manage network devices, such as the main office 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless access points 106a-c. Switches 108 and wireless access points 106a-c provide network connectivity to various client devices 110a-j. Using a connection to a switch 108 or access point 106a-c, a client device 110a-j is able to access network resources, including other devices on the network and the network 120.

Examples of client devices include, but are not limited to: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, netbook computers, televisions and similar monitors, content receivers, set-top boxes, personal digital assistants (PDAs), mobile phones, smart phones, smart terminals, dumb terminals, virtual terminals, video game consoles, and the like.

Within the main office 102, a switch 108 is included as one example of a point of access to the network for wired client devices 110i-j. Client devices 110i-j may connect to the switch 108 and through the switch 108 may be able to access other devices within the network configuration 110. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless access points 106a-c are included as another example of a point of access to the network for client devices 110a-h. An access point 106a-c is a combination of hardware, software, and/or firmware that is configured to provide wireless network connectivity to wireless client devices 110a-h. In the illustrated embodiment, the access points 106a-c can be managed and configured by the controller 104. The access points 106a-c communicate with the controller 104 and the network over either wired 112 or wireless 114 connections.

Client devices within a network (e.g. wireless local area networks, or "WLANs") communicate with access points in order to obtain access to one or more network resources. An access point, referred to as an "AP", may include a digital device that operates as a gateway for a client device to establish a connection (e.g., a communicative coupling) with one or more networks (e.g., the Internet, an intranet, etc.). For example, an access point may be implemented as a wireless access point (WAP), which is configured to communicate wirelessly with one or more client devices as well as communicate with a network device on the one or more networks, such as a controller for example, through a wired connection.

The network configuration 100 may include one or more remote sites 132, 142. A remote site 132 may be located in a different physical or geographical location from the main office 102. In some cases the remote site 132 may be in the same geographical location, or possibly the same building, as the main office, 102, but lacks a direct connection to the network located within the main office 102, relying instead on a connection over a different network 120. A remote site 132 such as the one illustrated may be, for example, a satellite office. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or access point 136 in communication with the gateway 134 over either wired or wireless connections. The switch 138 and access point 136 provide connectivity to the network for various client devices 140a-d.

In various embodiments, the remote site 132 is in direct communication with main office 102, such that client devices 140a-d at the remote site 132 access the network resources at the main office 102 as if these clients 140a-d were located at the main office 102. In such embodiments, the remote site 132 is managed by the controller 104 at the main office, and the controller 104 provides the necessary connectivity, security, and accessibility that enable the remote site's 132 communication with the main office 102. Once connect to the main office 102, the remote site 132 may function as a part of a private network provided by the main office 102.

In various embodiments, the network configuration 100 may include one or more smaller remote sites 142, comprising only a gateway device 144 for communicating with the network 120 and a wireless access point 146, by which various client devices 150a-b access the network 120. Such a remote site 142 may represent, for example, an individual employee's home or a temporary remote office. The remote site 142 may also be in communication with the main office 102, such that the client devices 150a-b at remote site 142 access network resources at the main office 102 as if these client devices 150a-b were located at the main office 102. The remote site 142 may be managed by the controller 104 at the main office 102 to make this transparency possible. Once connected to the main office 102, the remote site 142 may function as a part of a private network provided by the main office 102.

The network 120 may be a public network, such as the Internet. A public network is a network that may be shared by any number of entities, including the illustrated network configuration 100. A public network may have unrestricted access, such that any user may connect to it. The network 120 may include any number of intermediate network devices, such as switches, routers, gateways, servers, and/or controllers, that are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a-j, 140a-d, 150a-b may request and access the multimedia content provided by the content servers 160a-b.

Figure 2:
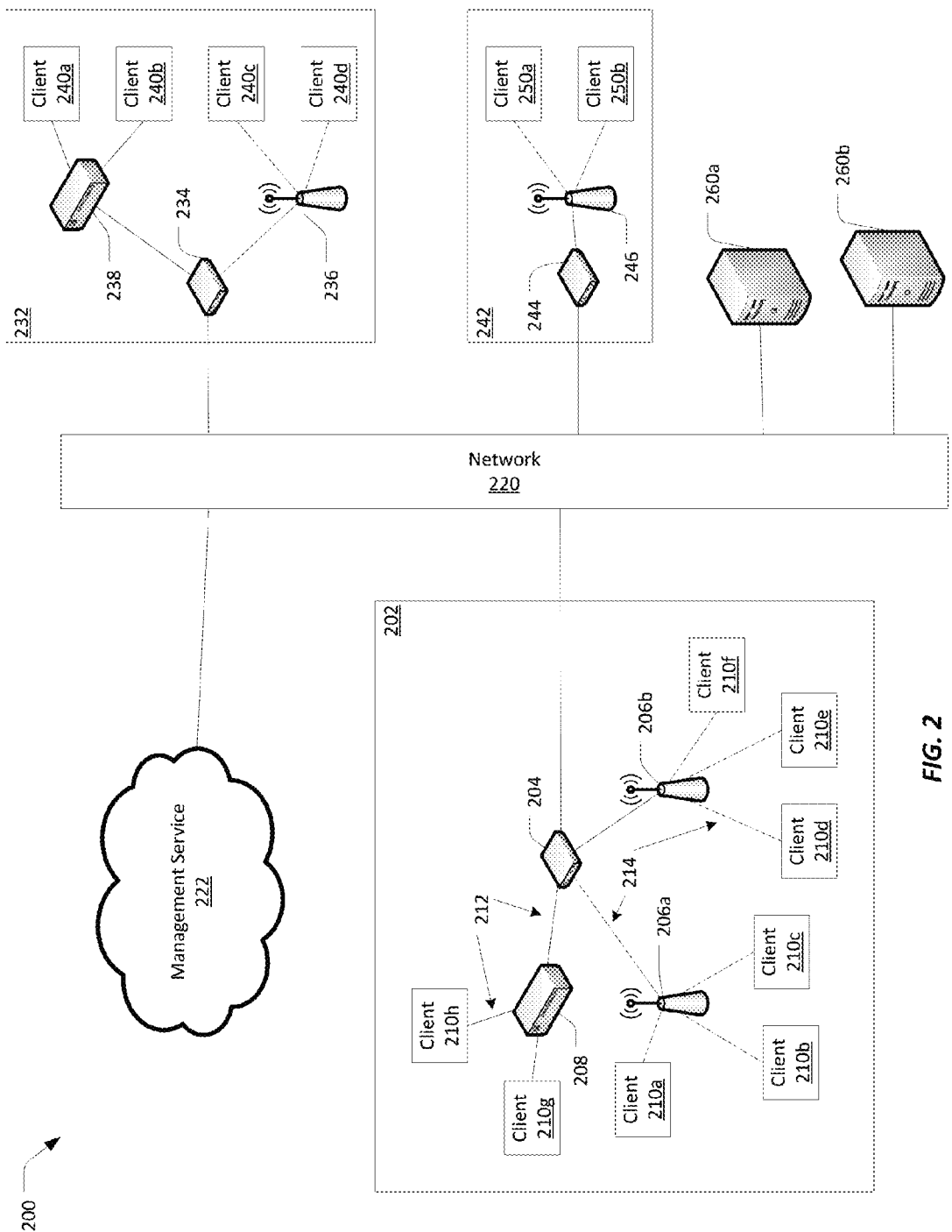
FIG. 2 illustrates an embodiment of a network configuration that includes a cloud-based management service, according to embodiments of the present technology.

FIG. 2 illustrates an embodiment of a network configuration 200 that includes a cloud-based management service 222. The network configuration 200 may be implemented for a multi-user organization. The network configuration 200 includes a main office 202 in communication with a network 220, and may also include one or more remote sites 232, 242, also in communication with the network 220. In the illustrated embodiment, the main office 202 includes a gateway device 204, such as a router, for communicating with the network 220. A single gateway device 204 is illustrated, though the main office 202 may include multiple gateway devices and/or multiple communication points with the network 220.

The gateway device 204 may be in communication with one or more switches 208 and/or wireless access points 206a-b. Routers 208 and access points 206a-b provide network connectivity to various client devices 210a-h. Using a connection to a switch 208 or access point 206a-b, a client device 210a-h is able to access network resources, including other devices on the network and the network 220.

A switch 208 is included as an example of a point of access to the network for client devices 210g-h. Client devices 210g-h may communicate with the switch 208 over a wired 212 connection. Wireless access points 206a-b are included as another example of a point of access to the network for client devices 210a-f. Client devices 210a-f may communicate with the access points 206a-b over wireless 214 connections. The access points 206a-b may themselves communicate with the gateway device 204 over either wired 212 or wireless 214 connections.

In some embodiments, the network configuration 200 may include a cloud-based management service 222. The management service 222 may include various software and software processes for configuring and/or managing network devices at the main office 202. Management tasks may include, for example, access, authentication, security, hardware management, and/or internal and/or external communication. The management service 222 may be running on a server local to the main office 202, or a server located remotely from the main office 202, or may be distributed across any number of local and/or remote servers. In embodiments where the management service 222 is located remote to the main office 202, the management service 222 may access the main office 202 over the network 220.

The network configuration 200 may include one or more remote sites 232, 242. A remote site 232 may include a gateway device 234 for communicating with the network 220. The remote site 232 may also include a switch 238 and/or access point 236 in communication with the gateway device 234 over either wired or wireless connections. The switch 238 and access point 236 provide connectivity to the network 220 for various client devices 240a-d.

In various embodiments, the remote site 232 may be configured and/or managed by the management service 222, such that client devices 240a-d at the remote site 232 access the network resources at the main office 202 as if these clients 240a-d were located at the main office 202. The management service 222 provides the necessary connectivity, security, and accessibility that enable the remote site's 232 communication with the main office 202.

In various embodiments, the network configuration 200 may also include one or more smaller remote sites 242, comprising only a gateway device 244 for communicating with the network 220 and a wireless access point 246, by which various client devices 250a-b access the network 220. The remote site 242 may also be configured and/or managed by the management service 222, such that the client devices 250a-b at the remote site 242 access network resources at the main office 202 as if these client devices 250a-b were located at the main office 202. The management service's 222 control over the remote site 242 makes this transparency possible.

The network 120 may be a public network, such as the Internet. The network 120 may include various content servers 260a-b. The client devices 210a-h, 240a-d, 250a-b may request and access data and content provided by the content servers 260a-b over their connection to the network 120.

Embodiments of the present disclosure relate to determining a location of a target wireless device. One goal of embodiments of the present technology is to be able to determine the location of a target wireless device, for example, without requiring the network devices involved to use time-of-flight measurements, or fine timing measurement (FTM) protocols, as defined in IEEE 802.11. Determining the location of the target wireless device may be performed by a particular network device (e.g. a network device that is in communication with, or within communication range of, the target device) based on signals transmitted between the target wireless device and other devices (for example, including the network device) on the same network as the target wireless device, such as access points (either associated with the target wireless device or otherwise). Embodiments of the present technology use hyperbolic time difference of arrival by two or more network devices (e.g. access points) to locate a Wi-Fi client (i.e. target device) by exchanging packets (or frames—these terms as used herein include both packets and frames) with the target device and using timestamps to designate arrival and departure times of the transmitted and received packets. The timestamps may then be used to determine the location of the target device.

Figure 3:
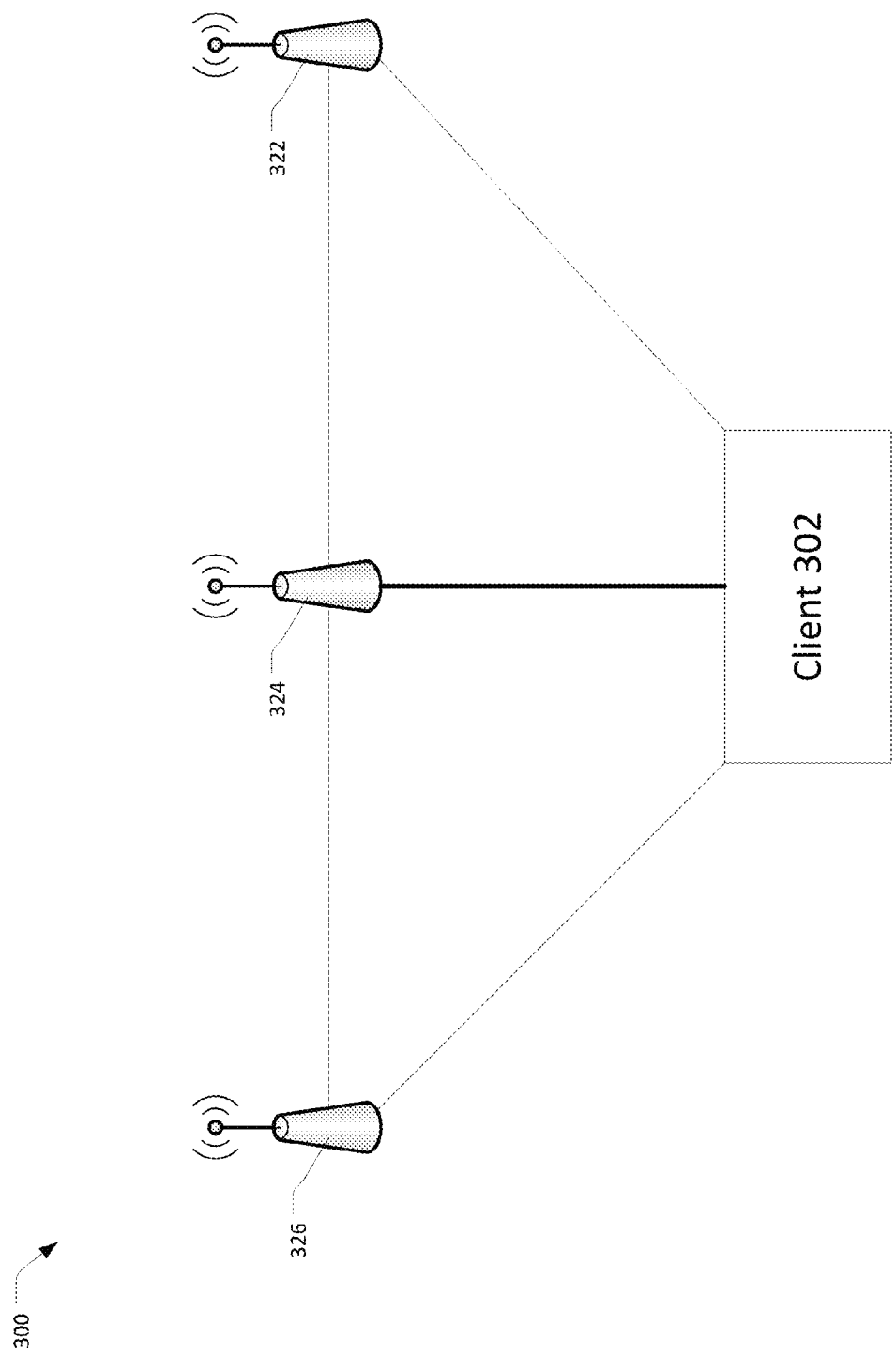
FIG. 3 illustrates an embodiment of a network configuration that includes access points and a client, according to embodiments of the present technology.

FIG. 3 illustrates an embodiment of a network configuration 300 that includes access points and a client, according to embodiments of the present technology. Network configuration 300, as shown in FIG. 3, includes a client 302 and access points 322, 324 and 326. Although network configuration 300 includes three access points, in this embodiment, client device 302 is associated with only one of the three access points, such as access point 324. An access point that is associated with client 302 may be called an associated access point, such as associated access point 324. While access points 322 and 326 may not be associated with client 302, access points 322 and 326 may still be in communication with client 302 in one or more of various different ways. For example, access points 322 and 326 may be on the same channel within a particular RF band as client 302 (and, for example, associated access point 324) so that access points 322 and 326 may be able to hear or receive signals (e.g. packets or frames) transmitted by and/or to client 302.

According to embodiments of the present technology, network configuration 300 may include more or fewer numbers of access points. Furthermore, network configuration 300 may include other types of devices other than (or in addition to) access points, and those other devices may implement embodiments of the present technology instead of (or in addition to) access points 322, 324 and 326.

As noted, access points 322, 324 and 326 may all be on the same channel (e.g. WiFi channel or other types) as client 302 even though less than all three of the access points (e.g. one) may be associated with client 302. According to embodiments of the present technology, two or three of access points 322, 324 and 326 may be used, when they are on the same channel as each other and as client 302, to determine a location of client 302. Access points 322, 324 and 326 may not initially be connected to the same channel, but may join the same channel in order to determine the location of client device 302. For example, one or two of the access points may join the channel that one or more of the other access points on the network are connected to. For example, access points 322 and 326 may connect to the channel that associated access point 324 is connected to (either because access point 324 is the access point associated with client 302 or for a different reason). Access points 322, 324 and 326 may also communicate with each other to determine which channel all three access points will join. For example, one access point may transmit a communication to the other access point(s) to tell the other access point(s) which channel to join. In another embodiment, a separate device (e.g. a controller) may communicate with each of the access points that the controller wants to connect to a certain channel and may transmit information indicating to the access points which channel they should join. Other methods may be used to accomplish the task of getting multiple access points connected on the same channel. However, access points 322, 324 and 326 may already be located on the same channel, and therefore may not have to actively join the same channel.

A client, such as client device 302, may be sleeping (e.g. turned off or on standby) at the time that the access points (or a controller that manages the access points) wants to locate the client device. In other words, a client device 302 may be sleeping or turned off because it is in power save mode to save power while client device 302 is not in use. Access points in network configuration 300 may not know when client 302 will wake up, and therefore may not be able to coordinate the access points joining the same channel at the same time that client device 302 is awake. In such a situation, one access point (e.g. access point 324) may transmit (e.g. broadcast) a communication to the other access points that access point 324 will transmit a message to client device 302 to try to wake up client device 302. One access point may know which other access points are on the same network as it because access points may be periodically (or at a different rate) transmitting messages such as WiFi beacons to the other devices within range of the access point. Such transmissions may allow a network device to keep track of which other network devices (e.g. which other access points) are on the network. Therefore, the other access points may join the channel indicated by access point 324 and may hear or receive the wake up communication sent to the client device 302 by access point 324, and may subsequently hear or receive any response sent by client device 302 after client device 302 wakes up.

In another embodiment, an access point, such as access point 324, may embed a notification or other message in a WiFi beacon frame that it transmits (e.g. broadcasts) to indicate to the client device that the access point will transmit a communication to the client device at a later time. Such an indication may allow the client device to wake up when it knows that such a communication has been sent so that it may receive the communication. For example, the access point may set a traffic indication map (TIM) bit in a beacon to be broadcasted on network 300. Client device 302 may, for example, schedule itself to wake up from its sleep mode when an access point is scheduled to transmit a beacon frame (including, for example, network information or information related to the access point or its status). Therefore, the client device may look for the TIM bit (or another particular bit) within the beacon frame. The TIM bit may indicate to the client device that, for example, the access point will send a communication to the client device at a particular time (or indicate, for example, that the communication will be transmitted by the access point directly after the beacon frame) so that the client device 302 will know it is coming and can wake up or otherwise be ready to receive it.

Figure 4:
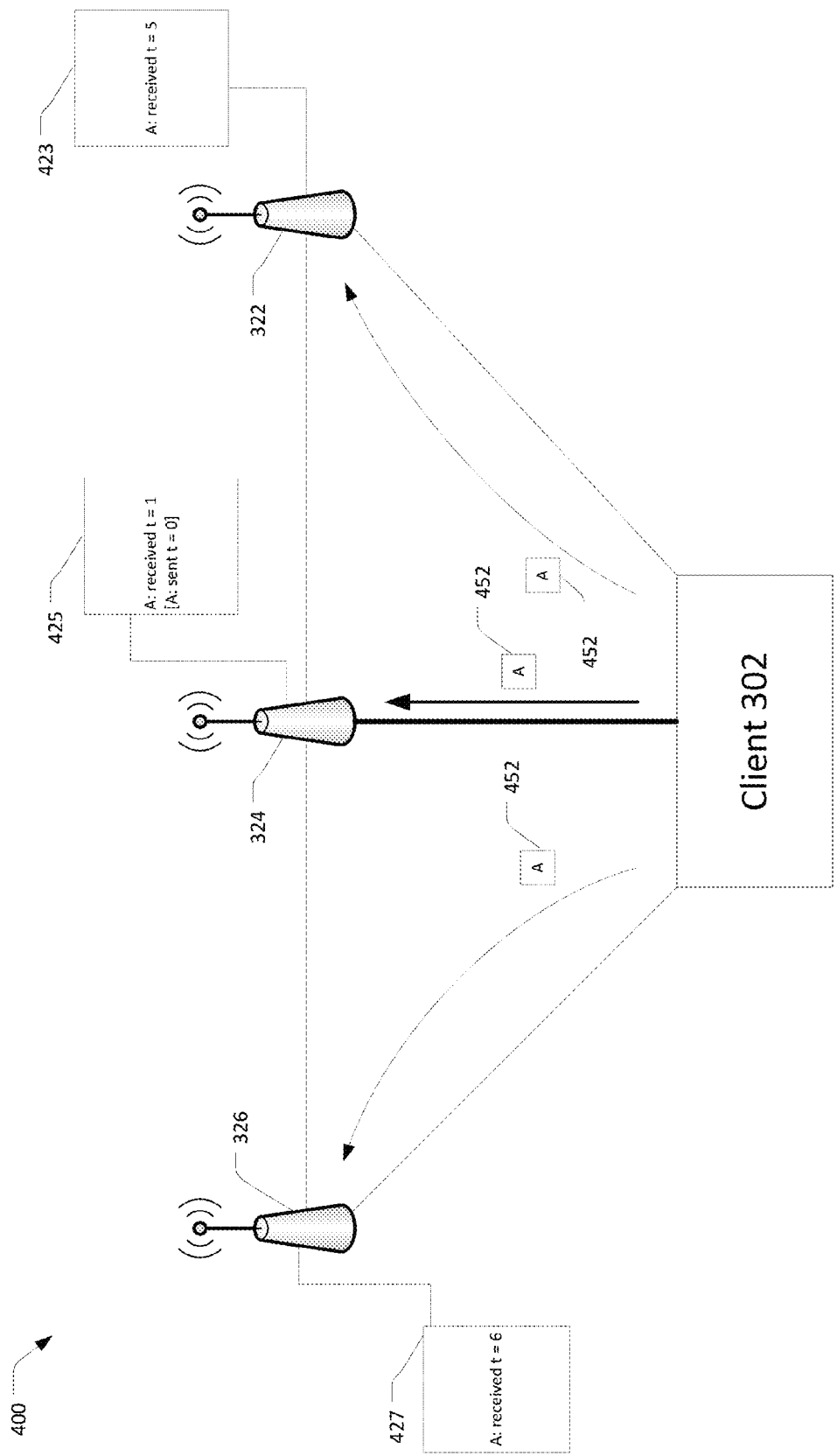
FIG. 4 illustrates an embodiment of a network configuration that includes access points and a client communicating with one of the access points, according to embodiments of the present technology.

If client device 302 is awake and access points 322, 324 and 326 are all on the same channel, the process for determining a location of the client device 302 may begin. FIG. 4 illustrates an embodiment of a network configuration 400 that includes access points and a client communicating with one of the access points, according to embodiments of the present technology. As noted, a location of a client device may be determined using timestamps placed on communications between the target client device and other network devices (e.g. access points such as access points 322, 324 and 326) on the same network as the target client device. As shown in FIG. 4, client 302 may initiate the communication with access point 324, which client 302 may be associated with, by transmitting a communication "A" 452 (e.g. a one or more packets, one or more frames, etc.). Client device 302 may transmit communication 452 directly to access point 324 via a specific channel (e.g., WiFi channel), or it may broadcast communication 452 on the channel. Since access point 324 is associated with client device 302 and on the same channel, access point 324 may receive communication 452 at a point in time after it is transmitted by client device 302. Since access points 322 and 326 are on the same channel and within transmission range of client device 302, access points 322 and 326 may also hear communication 452 after communication 452 is transmitted by client device 302 (even though access points 322 and 326 may not be associated with client device 302).

Access points within a network may monitor each other, for example, periodically or sporadically. For example, access points 322 and 326 may always or almost always listen to communications transmitted by other access points on the network. Alternatively, an access point may choose to only listen to certain other access points at certain times or when certain types of transmissions are sent by other access points in the network. For example, an access point may subscribe to another access point on the network and may set certain conditions under which the access point receives or listens to communications from other access points. Such conditions may be set based on the specific circumstances or specific relationship between the relevant network devices.

Client device 302 may periodically initiate the process of one or more other devices (e.g. access point 324) locating client 302 by transmitting a communication, or client device 302 may transmit such a communication in response to receiving a prompt (e.g. another communication from access point 324, a controller device, or another device) from another device.

When access point 324 receives communication 452 from client device 302 (although access point 324 may or may not know that the communication 452 was sent by client device 302), access point 324 may assign a timestamp to the communication representing the time that it received communication 452 (e.g., as shown in FIG. 4, the timestamp for communication 452 may be recorded as t=1). Access points 322 and 326 may, similarly, assign respective timestamps to the communication representing the time that they each received or heard communication 452 via the specific channel (e.g., as shown in FIG. 4, the timestamps for communication 452 may be recorded as t=5 and t=6, respectively). Each of the access points may then store their respective timestamps in a storage medium. For example, access point 324 may store its timestamp in storage medium 425, access point 322 may store its timestamp in storage medium 423, and access point 326 may store its timestamp in storage medium 427. The storage medium may be located within each access point, or the storage medium may be located outside of each access point (e.g., together or separately in another network device or devices, in a cloud network, etc.). The timestamps recorded or assigned by each access point may be different, or each may be the same (or certain subgroups of access points on the network may have the same timestamp, while others different). The timestamps may be very accurate, such as accurate to the nanosecond. As such, timestamps recorded by different access points corresponding to the same communication may be different by just a matter of nanoseconds (e.g., 1, 2, 3, 4 or 5 nanoseconds).

An access point, such as access point 324, 322 or 326, may identify the network device that transmitted a received communication. For example, an access point may identify the client device by reading a MAC address embedded within the communication. Alternatively, the access point may identify the client device through another mechanism such as through an authentication process or certificate.

Figure 5:
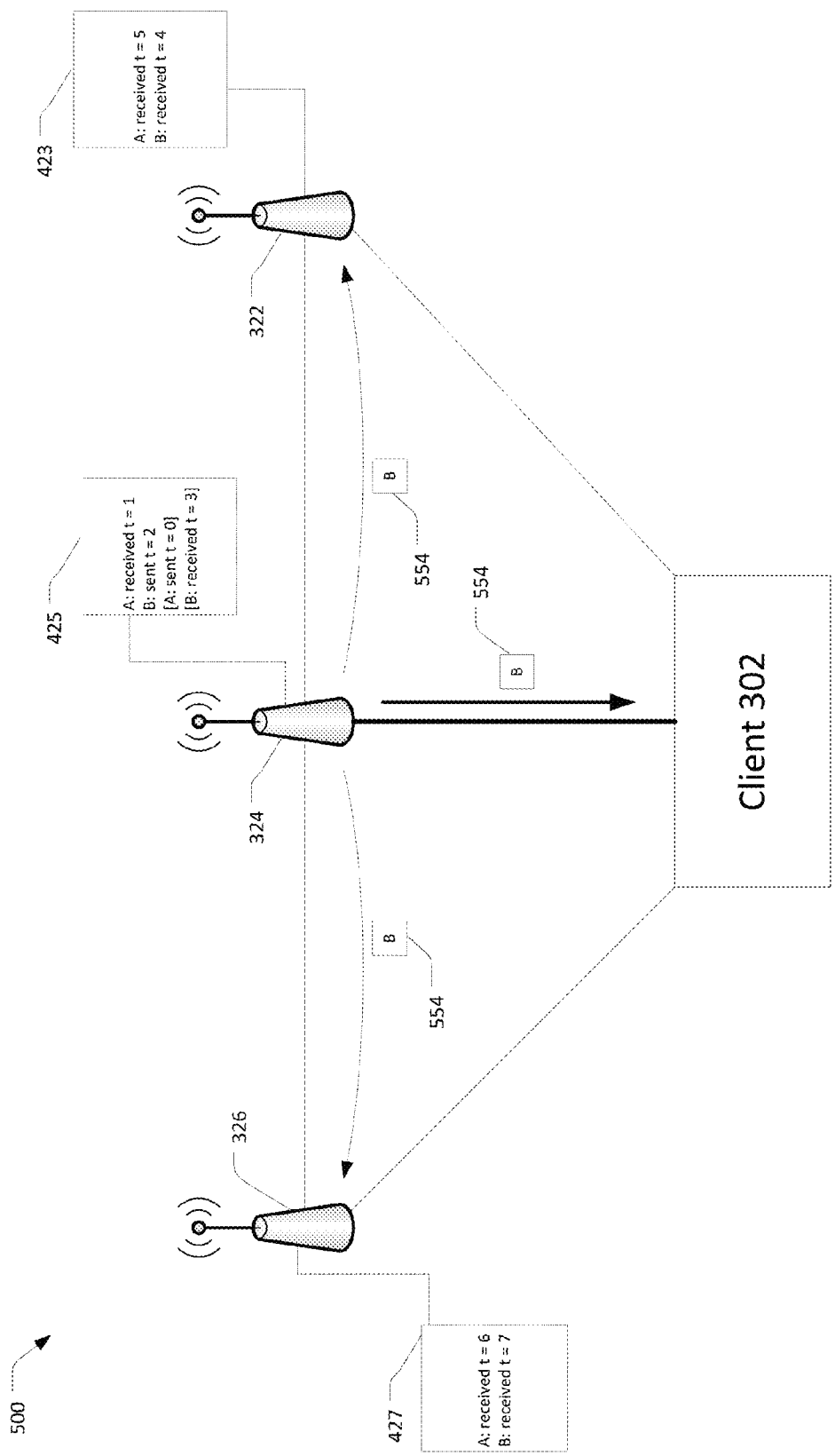
FIG. 5 illustrates an embodiment of a network configuration that includes access points and a client communicating with one of the access points, according to embodiments of the present technology.

FIG. 5 illustrates an embodiment of a network configuration 500 that includes access points and a client communicating with one of the access points, according to embodiments of the present technology. After access point 324 receives a communication 452 from client device 302, access point 324 may transmit a communication back to client device 302 in response to the client device's communication. For example, the response communication may be an ACK or another type of message. As shown in FIG. 5, access point 324 may transmit a communication B 554 to client device 302 over a specific channel. The specific channel that access point 324 uses to transmit communication 554 may be the same as the channel that client device 502 used to transmit communication 452, or may be a different channel (as long as, for example, client device 302 and the access points are on the same channel when the communication is received).

Access point 324 may, upon transmitting communication 554, assign a timestamp to communication 554 indicating the time that access point 324 transmitted communication 554. For example, as shown in FIG. 5, this timestamp may be recorded as timestamp t=2. Access point 324 may also store this timestamp in storage, for example in storage medium 425. Upon receiving communication 554 transmitted by access point 324, access points 322 and 326 may also assign timestamps to communication 554 indicating the time that each of the access points received communication 554. For example, access point 322 may assign a timestamp of t=4 to communication 554, and access point 326 may assign a timestamp of t=7 to communication 554. Access points 322 and 326 may then store these timestamps in storage. For example, access point 322 may store timestamp t=4 in storage medium 423, and access point 326 may store timestamp t=7 in storage medium 427.

Figure 6:
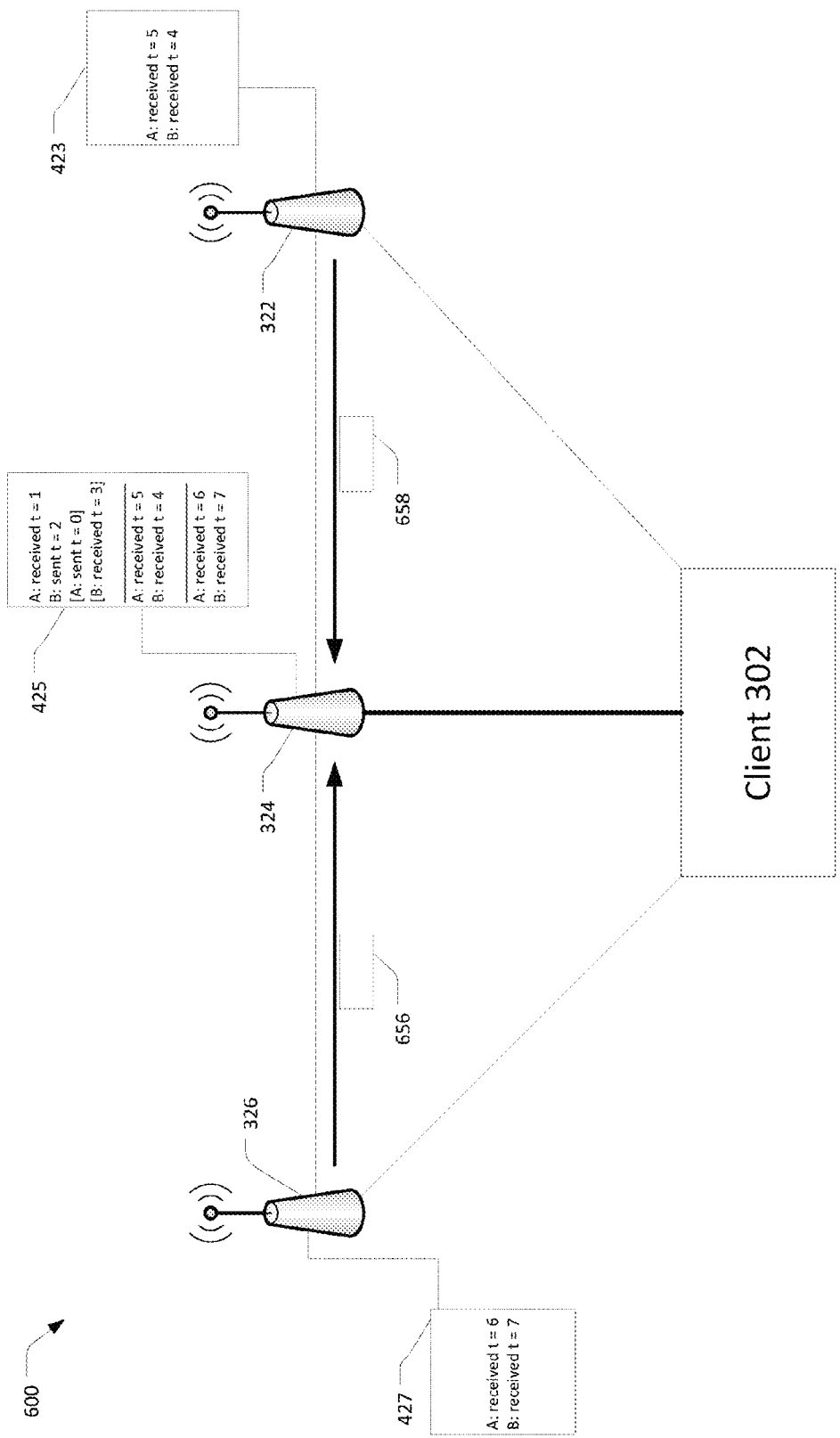
FIG. 6 illustrates an embodiment of a network configuration that includes access points and a client communicating with one of the access points, according to embodiments of the present technology.

After both communications (e.g., communications 452 and 554) have been transmitted between client device 302 and its associated access point 324, each of access points 322, 324 and 326 have stored two timestamps. These timestamps may be used, as described herein, to determine the distance of client device 302 from the access point. Therefore, it may be beneficial for a single device (either one of the devices on network 500 or another device) to compile the timestamps recorded and/or stored by each of the access points, as shown in FIG. 6. FIG. 6 illustrates an embodiment of a network configuration 600 that includes access points and a client communicating with one of the access points, according to embodiments of the present technology. As shown in FIG. 6, access points 322 and 326 may transmit data to access point 324, including their respective recorded timestamp data. More specifically, access point 322 may transmit communication 658 to access point 324 including its recorded timestamps t=5 (for communication A) and t=4 (for communication B), and access point 326 may transmit communication 656 to access point 324 including its recorded timestamps t=6 (for communication A) and t=7 (for communication B). After such data is transmitted to access point 324, access point 324 may store all accumulated timestamp data in storage medium 425, as shown within storage medium 425. The three sets of timestamp data accumulated by access point 324 may be used to determine (e.g. calculate) the location of client device 302.

In an alternative embodiment, instead of (or in addition to) access points 322 and 326 transmitting its timestamp data to access point 324, each access point may transmit its timestamp data to another device. The other device may be a device within the network, such as another access point or a controller device, or outside the network, such as a cloud network.

Although embodiments herein are described using timestamps in the form of t=a number N, the chronological order of numbers N do not necessarily represent a chronological order of when the devices transmitted or received a certain communication. For example, a timestamp t=1 may not represent a communication that was received or transmitted before a communication that is assigned a timestamp of t=2.

As noted with respect to FIGS. 4-6, a location of a client device may be determined using timestamps placed on communications between the target client device and other network devices where a client device initiates the communication by transmitting a communication to an access point associated with it. However, in an alternative embodiment, a location of a client device may be determined using timestamps placed on communications between the target client device and other network devices where an access point initiates the communication by transmitting a communication to a client device associated with it.

Figure 7:
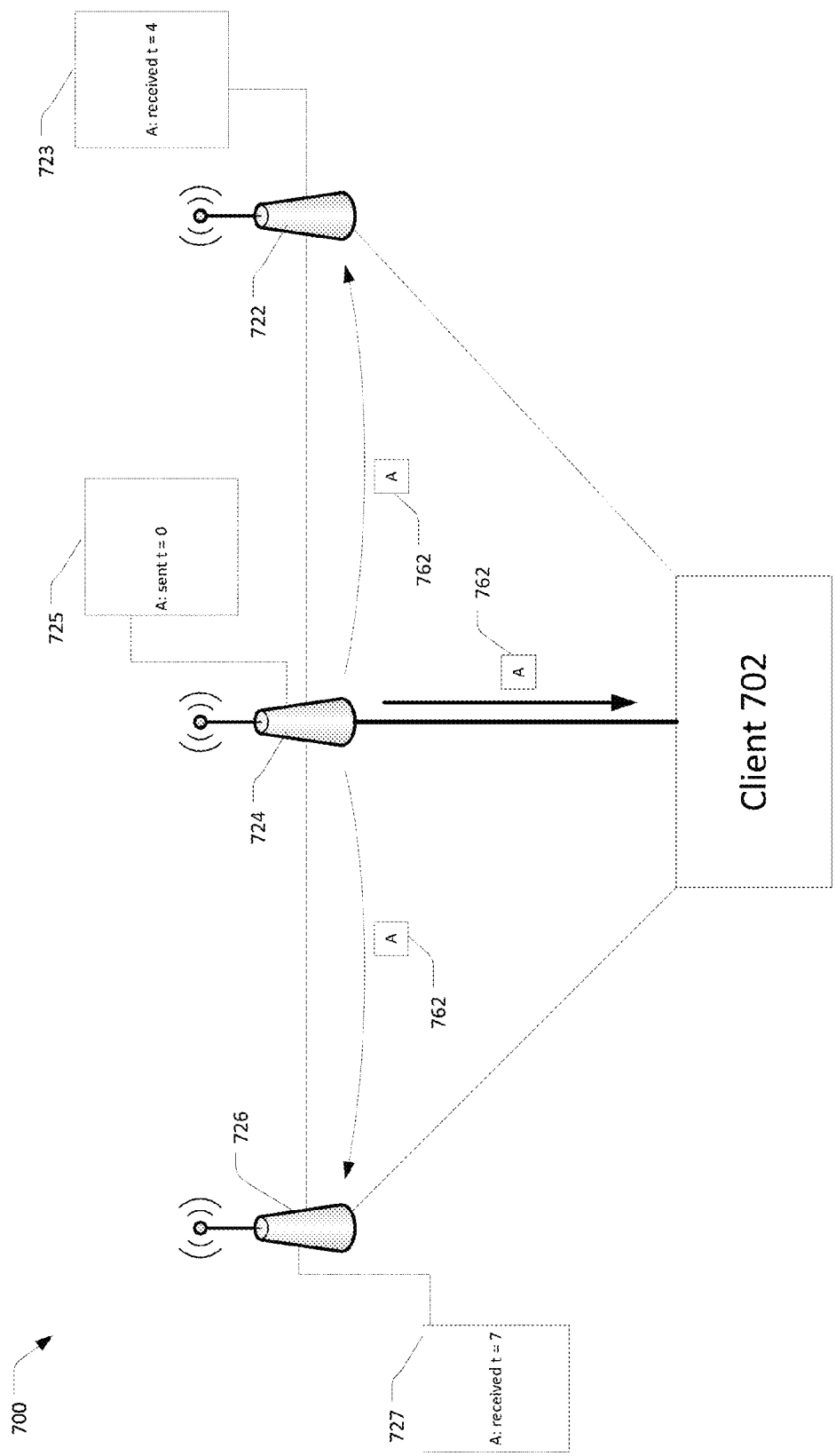
FIG. 7 illustrates an embodiment of a network configuration that includes a client and access points where one of the access points is communicating with the client, according to embodiments of the present technology.

FIG. 7 illustrates an embodiment of a network configuration 700 that includes a client and access points where one of the access points is communicating with the client, according to embodiments of the present technology. Network configuration 700, as shown in FIG. 7, includes a client 702 and access points 722, 724 and 726. Although network configuration 700 includes three access points, client device 702 may be associated with only one of the three access points, such as access point 724. An access point that is associated with client 702 may be called an associated access point, such as associated access point 724. While access points 722 and 726 may not be associated with client 702, access points 722 and 726 may still be in communication with client 702 in one or more of various different ways. For example, access points 722 and 726 may be on the same channel as client 702 (and, for example, associated access point 724) so that access points 722 and 726 may hear or receive signals (e.g. packets or frames) transmitted by or to client 702.

As noted, a client, such as client device 302, may be sleeping (e.g. turned off or on standby) at the time that the access points (or a controller that manages the access points) wants to locate the client device, as described herein with respect to FIGS. 4-6. On the other hand, a client device 302 may be not be sleeping or turned off and therefore not in power save mode. Such an embodiment is described herein with respect to FIGS. 7-9.

If client device 702 is awake and access points 722, 724 and 726 are all connected to the same channel, the process for determining a location of the client device 702 may begin. As noted, a location of a client device may be determined using timestamps placed on communications between the target client device and other network devices (e.g. access points such as access points 722, 724 and 726) on the same network as the target client device. As shown in FIG. 7, access point 724 may initiate the communication with client device 702, which access point 724 may be associated with, by transmitting a communication "A" 762 (e.g. a one or more packets, one or more frames, etc.). Access point 724 may transmit communication 762 directly to client device 702 via a specific channel, or it may broadcast communication 762 across the channel. Since access point 724 is associated with client device 702 and on the same channel, client device 702 may receive communication 762 at a point in time after it is transmitted by client device 702. Since access points 722 and 726 are connected to the same channel (even though access points 722 and 726 may not be associated with client device 702), access points 722 and 726 may also hear communication 762 after communication 762 is transmitted by client device 702.

Access point 724 may periodically initiate the process of one or more other devices (e.g. access point 724) locating client 702 by transmitting such a communication, or access point 724 may transmit such a communication in response to receiving a prompt (e.g. another communication from a controller device, or another device) from another device.

When client device 702 receives communication 762 from access point 724 (although client device 702 may or may not know that the communication 762 was sent by access point 724), access point 724 may assign a timestamp to the communication representing the time that it sent communication 762 (e.g., as shown in FIG. 7, the timestamp for communication 762 may be recorded as t=0). Access points 722 and 726 may, similarly, assign respective timestamps to the communication representing the time that they each received or heard communication 762 via the channel (e.g., as shown in FIG. 7, the timestamps for communication 762 may be recorded as t=4 and t=7, respectively). Each of the access points may then store their respective timestamps in a storage medium. For example, access point 724 may store its timestamp in storage medium 725, access point 722 may store its timestamp in storage medium 723, and access point 726 may store its timestamp in storage medium 727.

The storage medium may be located within each access point, or the storage medium may be located outside of each access point (e.g., in another network device, in a cloud network, etc.). The timestamps recorded or assigned by each access point may be different, or each may be the same (or certain subgroups of access points on the network may have the same timestamp, while others different). The timestamps may be very accurate, such as accurate to the nanosecond. As such, timestamps recorded by different access points corresponding to the same communication may be different by just a matter of nanoseconds (e.g., 1, 2, 3, 4 or 5 nanoseconds).

An access point, such as access point 724, 722 or 726, may identify the network device that transmitted a received communication. For example, an access point may identify the sender by reading a MAC address embedded within the communication.

Figure 8:
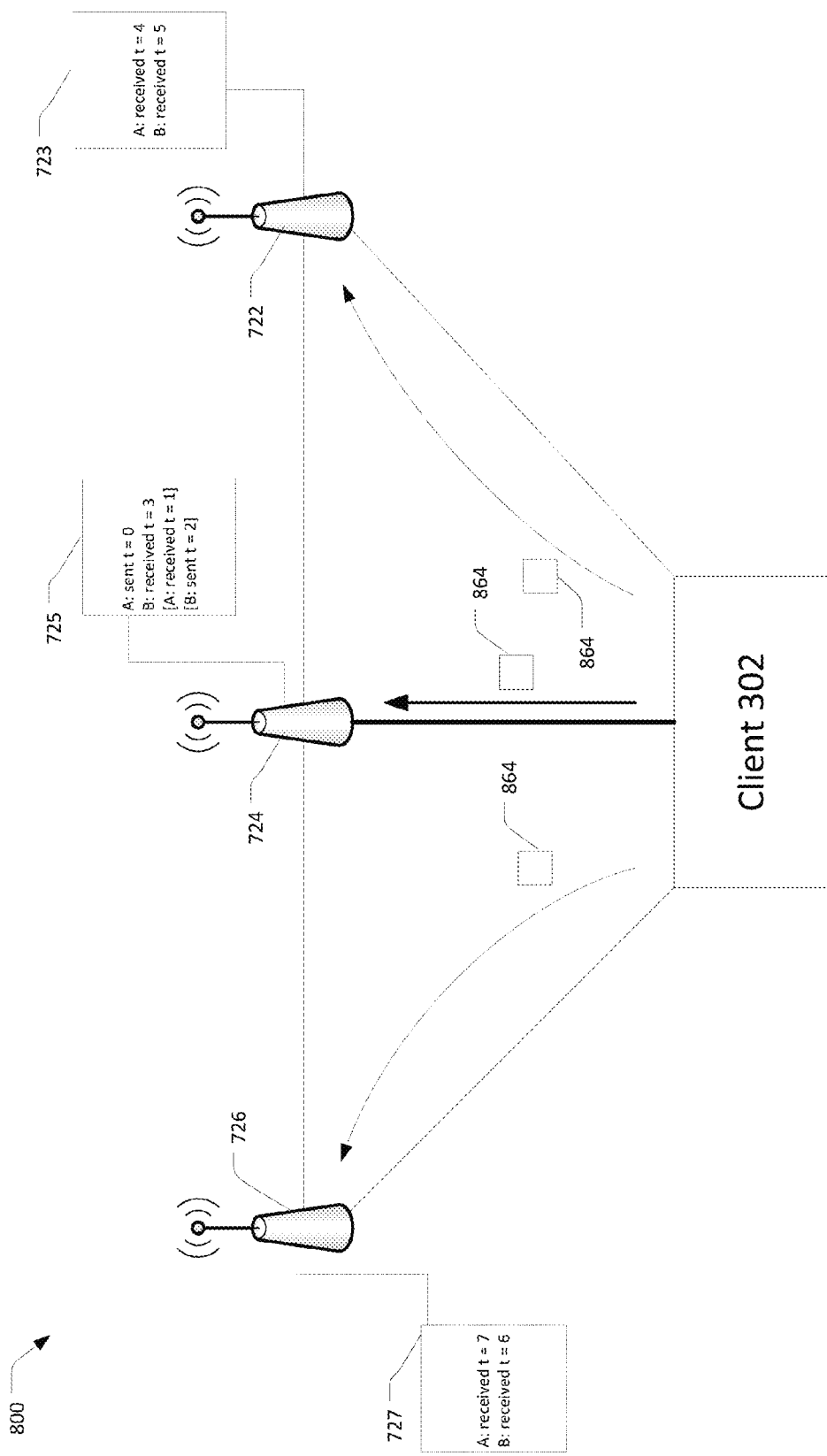
FIG. 8 illustrates an embodiment of a network configuration that includes access points and a client communicating with one of the access points, according to embodiments of the present technology.

FIG. 8 illustrates an embodiment of a network configuration 800 that includes access points and a client communicating with one of the access points, according to embodiments of the present technology. After client device 702 receives a communication 762 from access point 724, client device 702 may transmit a communication back to access point 724 in response to the client device's communication. For example, the response communication may be an ACK or another type of message. As shown in FIG. 8, client device 702 may transmit a communication B 864 to access point 724 over a specific channel. The specific channel that client device 702 uses to transmit communication 864 may be the same as the channel that access point 724 used to transmit communication 762, or may be a different channel (as long as, for example, client device 702 and the access points are on the same channel when the communication is transmitted.

Access point 724 may, upon receiving communication 864, assign a timestamp to communication 864 indicating the time that access point 724 received communication 864. For example, as shown in FIG. 8, this timestamp may be recorded as timestamp t=3. Access point 724 may also store this timestamp in storage, for example in storage medium 725. Upon receiving communication 864 transmitted by access point 724, access points 722 and 726 may also assign timestamps to communication 864 indicating the time that each of the access points received communication 864. For example, access point 722 may assign a timestamp of t=5 to communication 864, and access point 726 may assign a timestamp of t=6 to communication 864. Access points 722 and 726 may then store these timestamps in storage. For example, access point 722 may store timestamp t=4 in storage medium 723, and access point 726 may store timestamp t=7 in storage medium 727.

Figure 9:
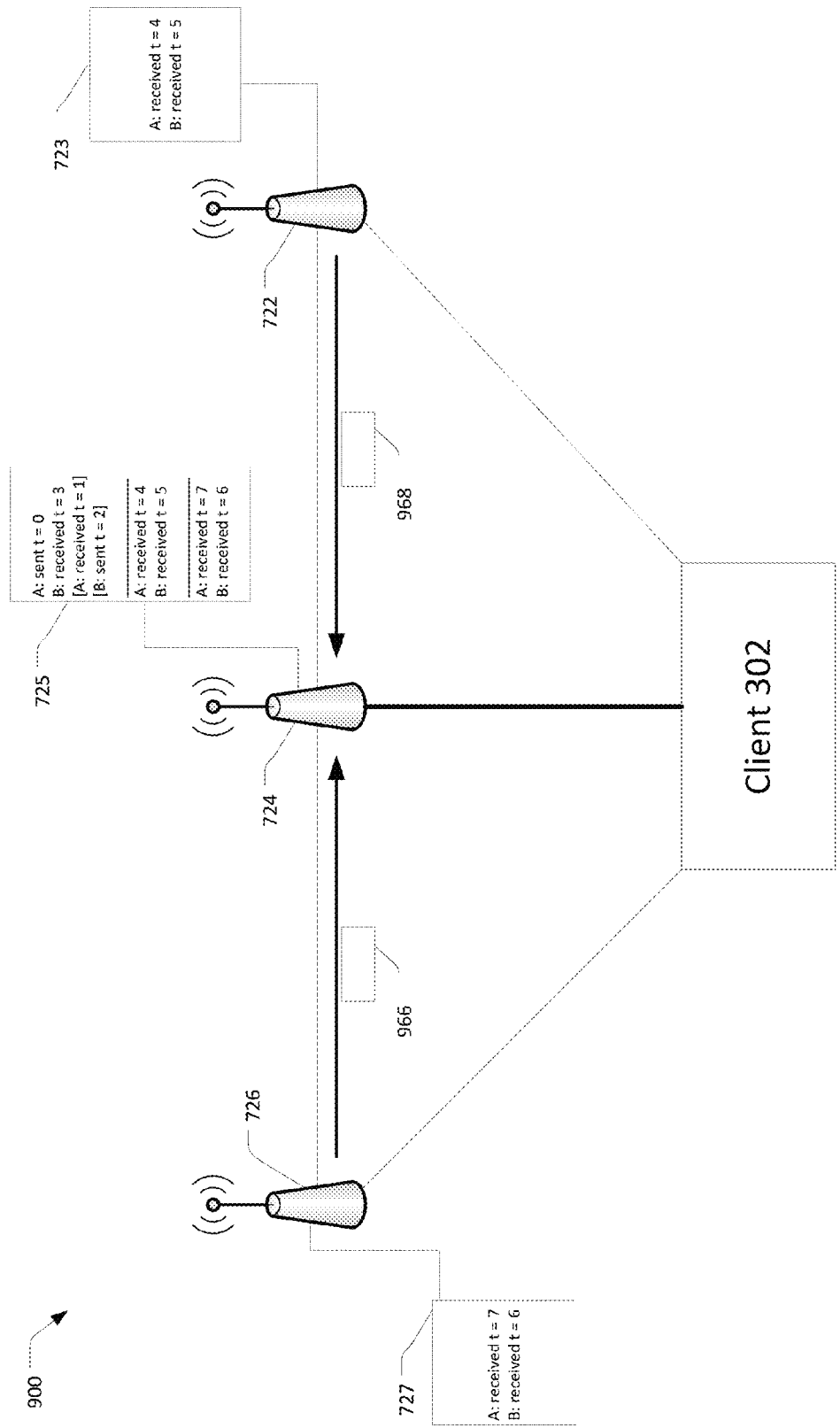
FIG. 9 illustrates an embodiment of a network configuration that includes access points and a client communicating with one of the access points, according to embodiments of the present technology.

After both communications (e.g., communications 762 and 864) have been transmitted between client 702 and its associated access point 724, each of access points 722, 724 and 726 have stored two timestamps. These timestamps may be used, as described herein, to determine the distance of client device 702. Therefore, it may be beneficial for a single device (either one of the devices on network 800 or another device) to compile the timestamps recorded and/or stored by each of the access points, as shown in FIG. 9. FIG. 9 illustrates an embodiment of a network configuration 900 that includes access points and a client communicating with one of the access points, according to embodiments of the present technology. As shown in FIG. 9, access points 722 and 726 may transmit data to access point 724, including their respective recorded timestamp data. More specifically, access point 722 may transmit communication 968 to access point 724 including its recorded timestamps t=4 (for communication A) and t=5 (for communication B), and access point 726 may transmit communication 966 to access point 724 including its recorded timestamps t=7 (for communication A) and t=6 (for communication B). After such data is transmitted to access point 724, access point 724 may store all accumulated timestamp data in storage medium 725, as shown within storage medium 725. The three sets of timestamp data accumulated by access point 724 may be used to determine (e.g. calculate) the location of client device 702.

In an alternative embodiment, instead of (or in addition to) access points 722 and 726 transmitting its timestamp data to access point 724, each access point may transmit its timestamp data to another device. The other device may be a device within the network, such as another access point or a controller device, or outside the network, such as a cloud network.

In the embodiments described in FIGS. 4-9, the systems and processes are described to include an access point, such as access point 324 or 724, that is associated with client device 302, and which uses timestamps generated by itself and by other access points to determine the location of client device 302. However, timestamps may be obtained from other devices as well, such as client device 302. Client device 302 may assign timestamps to communications it receives and transmits, such as communications 452 and 554 from network configurations 400 and 500, respectively, and such as communications 762 and 864 from network configurations 700 and 800, respectively. Client device 302 may store those timestamps in a storage medium within client device 302 or may send its collected timestamp data to other devices, such as access point 724, another access point on the network, or to a device external to the network, such as a cloud network device. Therefore, access point 724 may also obtain timestamps assigned and collected by client device 302. For example, client device 302 may transmit its timestamp data within communications it transmits to access point 724 or otherwise broadcasts on a channel on the network (e.g. the same channel that access points 722, 724 and 726 are connected to). Client device 302 may also transmit its timestamp data within other communications, such as in a WiFi beacon frame.

Figure 10:
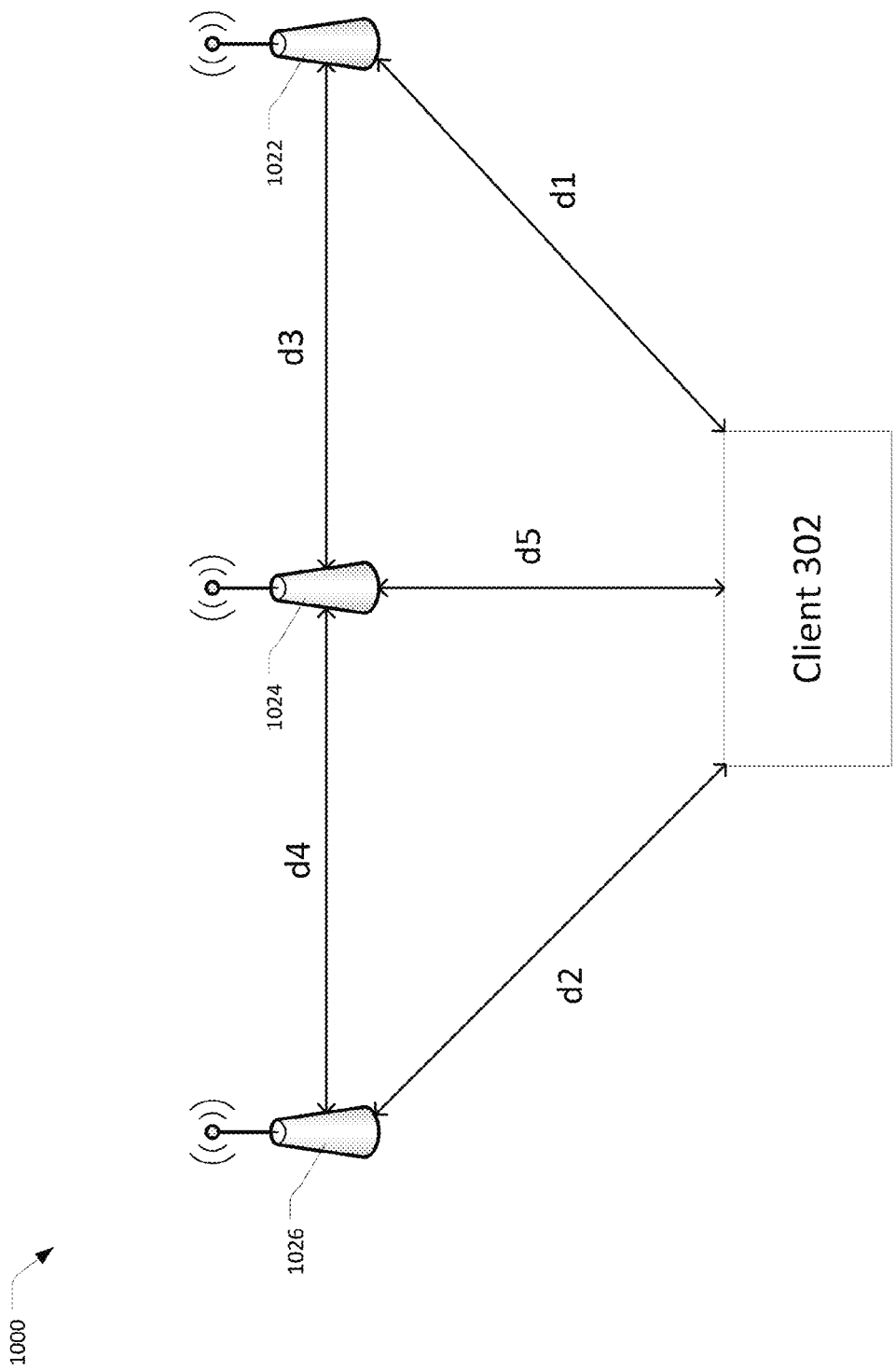
FIG. 10 illustrates an embodiment of a network configuration that includes access points and a client device, according to embodiments of the present technology.

FIG. 10 illustrates an embodiment of a network configuration 1000 that includes access points and a client device, according to embodiments of the present technology. Network configuration 1000 is similar to, for example, network configurations 300 and 700 wherein a client device, client device 302, may be associated with an access point, such as access point 1024, and is also on the same network as other access points, such as access points 1022 and 1026, and may be connected to them via a single channel. As shown in the embodiments described in FIGS. 4-9, an access point or other network device may collect timestamps recorded when communications are transmitted and/or received between the different access points and client device 302. These timestamps may be used to determine the time periods required for a signal (e.g. a communication as described herein) to travel over the air between client device 302 and the access points on the network. Such time periods may be denoted by d1, d2, d3, d4, and d5 as shown in FIG. 10. For example, d1 represents the time period required for a signal (e.g. communication 864 from FIG. 8) to travel over the air between client device 302 and access point 1022. Such a time period may be determined, for example, by subtracting the timestamp recorded (e.g., by client device 302) to represent the time that client device 302 transmitted a communication from the timestamp recorded by access point 1022 to represent the time the communication received a communication transmitted from client device 302. Client device 302 may have transmitted its timestamp data to access point 1022, or another device may have received timestamp data from both devices to determine the relevant time period d1. Time periods d1, d2, d3, d4, and d5 may be used, along with the timestamps recorded by the access points (and, for example, client device 302), to determine the location of client device 302.

Referring back to FIG. 6, as noted a network device, such as access point 324, may collect timestamp information from multiple sources including itself and other access points on the same network as it (e.g. access points 322 and 326). To solve for the location of client device 302 using the timestamp and time period information collected by access point 324, the following equations may be used:

$$t5=d1+t0 \qquad \text{Equation 1}$$

$$t4=d3+t2=d3+t1+\Delta=d3+d5+t0+\Delta \qquad \text{Equation 2}$$

where timestamps t=x are represented as tx and where $\Delta=t2-t1$. To calculate the difference in time measurements (timestamps) seen at access point 324, equations 1 and 2 may be combined by subtracting them from each other as follows:

$$t4-t5=d3+d5+t0+\Delta-d1-t0 \qquad \text{Equation 3}$$

$$t4-t5=d3+d5+\Delta-d1 \qquad \text{Equation 4}$$

$$d5-d1=(t4-t5)-d3-\Delta \qquad \text{Equation 5}$$

"d5−d1" on the left side of equation 5 includes unknown variables. "(t4−t5)−d3−Δ" on the right side of equation 5 includes constants that may be represented as, for example, "C1". Therefore, $$d5-d1=C1 \qquad \text{Equation 6}$$

If the above process (with respect to equations 1-6) is executed from the perspective of, for example, access point 322, it yields the following equations:

$$C2=(t7-t6)-d4-\Delta \qquad \text{Equation 7}$$

$$d5-d2=C2 \qquad \text{Equation 8}$$

Equations 6 and 8 each represent a hyperbola. These hyperbola may be used to determine the location of client device 302. To solve these hyperbola for a location, equations 6 and 8 may be converted from equations from entities with distances into equations based on (x, y) coordinates. More specifically, the location of the wireless device (e.g. client device 302) may be determined by determining the intersection of the hyperbola. More equations similar to equations 6 and 8 may be generated for any additional access points that may hear the communications transmitted and received between client device 302 and associated access point 324.

Referring back to FIG. 9, as noted a network device, such as access point 324, may collect timestamp information from multiple sources including itself and other access points on the same network as it (e.g. access points 722 and 726). To solve for the location of client device 302 using the timestamp and time period information collected by access point 724, the following equations may be used:

$$t4=t0+d3 \qquad \text{Equation 9}$$

$$t5=d1+t2=d1+\Delta+t1=d1+\Delta+t0+d5 \qquad \text{Equation 10}$$

where timestamps t=x are represented as tx and where $\Delta=t2-t1$. To calculate the difference in time measurements (timestamps) seen at access point 324, equations 1 and 2 may be combined by subtracting them from each other as follows:

$$t4-t5=d3-d1-\Delta-d5 \qquad \text{Equation 11}$$

The time difference between when access point 722 transmits a communication (e.g., a data frame) and receives a communication back (e.g., an ack) from the client device may be calculated as:

$$t3-t0=2*d5+\Delta \qquad \text{Equation 12}$$

Δ may be solved for:

$$\Delta=t3-t0-2*d5 \qquad \text{Equation 13}$$

which can be substituted as:

$$t4-t5=d3-d1-(t3-t0-2*d5)-d5 \qquad \text{Equation 14}$$

$$t4-t5=d3-d1-t3+t0+d5 \qquad \text{Equation 15}$$

This equation may be rewritten as:

$$d5-d1=(t4-t5)-d3+(t0-t3) \qquad \text{Equation 16}$$

"d5−d1" on the left side of equation 16 includes unknown variables. "(t4−t5)−d3−Δ" on the right side of equation 16 includes constants that may be represented as, for example, "C1". Therefore, $$d5-d1=C1 \qquad \text{Equation 17}$$

If the above process (with respect to equations 9-17) is executed from the perspective of, for example, access point 326, it yields the following equation:

$$d5-d2=C2 \qquad \text{Equation 18}$$

Equations 17 and 18 each represent a hyperbola. These hyperbola may be used to determine the exact (or close to exact, within nanoseconds) location of client device 302. To solve these hyperbola for a location, equations 17 and 18 may be converted from equations from entities with distances into equations based on (x, y) coordinates. More specifically, the location of the wireless device (e.g. client device 302) may be determined by determining the intersection of the hyperbola. More equations similar to equations 17 and 18 may be generated for any additional access points that may hear the communications transmitted and received between client device 302 and associated access point 724.

Figure 11:
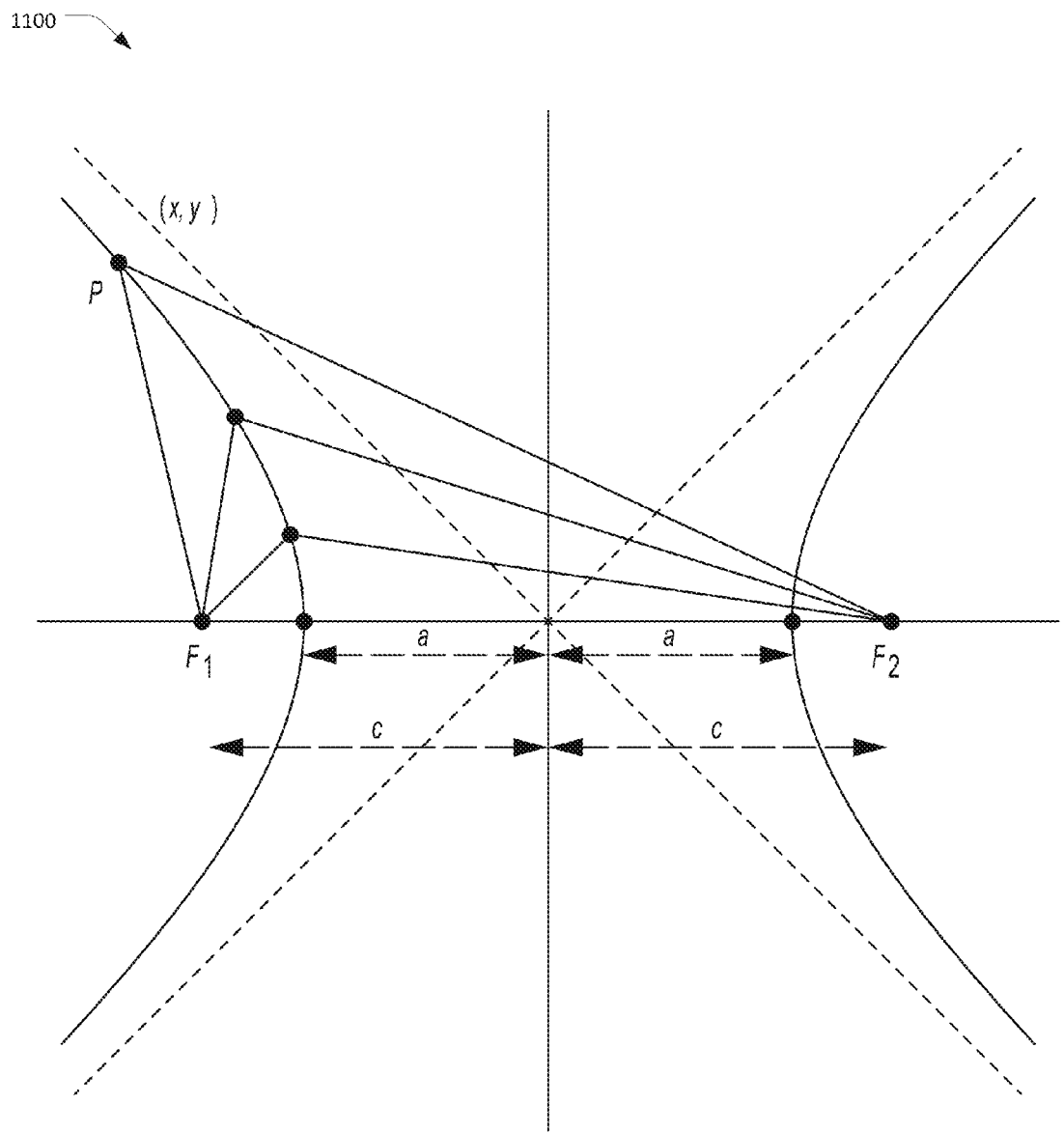
FIG. 11 illustrates a graph including an example set of hyperbola used to determine the location of a wireless device, according to embodiments of the present technology.

FIG. 11 illustrates a graph including an example set of hyperbola used to determine the location of a wireless device, according to embodiments of the present technology. In FIG. 11, the following meanings may be applied to the following terms:
- P=(x,y) coordinates along a line which represents possible locations of a particular wireless device being tracked
- F1=fixed point (may represent a location of a first network device)
- F2=fixed point (may represent a location of a second network device)
- r1=distance from F1 to P
- r2=distance from F2 to P from two fixed points (the foci F1 and F2) separated by a
- 2c=distance between F1 and F2

In the embodiment shown in FIG. 11, the following equations may be generated:

$$r1=F1*P \text{ and } r2=F2*P \qquad \text{Equation 9}$$

$$r2-r1=k \qquad \text{Equation 10}$$

$$k=(c+a)-(c-a)=2a, \qquad \text{Equation 11}$$

The constant k=2a (i.e., the distance between the x-intercepts). Further:

$$r2=d5 \qquad \text{Equation 12}$$

$$r1=d1. \qquad \text{Equation 13}$$

For a center (x0, y0), the equation of the hyperbola may be generalized to:

$$\frac{(x-x_0)^2}{a^2} - \frac{(y-y_0)2}{b^2} = 1. \qquad \text{Equation 14}$$

As shown, a location measurement may be generated using two access points (e.g. access points 322 and 324 in FIGS. 4-6).

To solve for the location of the target wireless device using the hyperbola, in polar coordinates (r, Θ), a hyperbola where the distance between foci (e.g., access points in the embodiments described herein with respect to FIGS. 3-9) is 2c and the shortest distance between the curves on the focus-focus line is 2a, has a locus defined by:

$$r = \frac{a(e^2-1)}{1-e\cos\Theta} \qquad \text{Equation 15}$$

where $$e = \frac{c}{a}t \qquad \text{Equation 16}$$

In this example, the distance between foci may be determined since the coordinates of the access points are known. The a term may also be determined because it is related to the difference between the radii from each focus. The focus-focus axis shows that one radius is c+a, and the other is c−a, and therefore the difference is 2a, which is a parameter being measured.

In polar coordinates, the serving access point (e.g. access point 324 or 724 as described herein) may be constrained to be at the origin. The monitoring access points (e.g. access points 322/326 or 722/726 as described herein) may not be constrained to be on any particular axis. They have coordinates of (2a, Φ), with parameters c, a, Φ. To solve two hyperbolas (with subscripts $AP_1$ and $AP_2$), the following solving of equations may be performed:

$$\frac{a_1(e_1^2-1)}{1-e_1\cos(\Theta+\phi_1)} = \frac{a_2(e_2^2-1)}{1-e_2\cos(\Theta+\phi_2)} \qquad \text{Equation 17}$$

$$a_1(e_1^2-1)(1-e_2\cos(\Theta+\phi_2)) = a_2(e_2^2-1)(1-e_1\cos(\Theta+\phi_1)) \qquad \text{Equation 18}$$

$$a_2e_1(e_2^2-1)\cos(\Theta+\phi_1) - a_1e_2(e_2^1-1)\cos(\Theta+\phi_2) = \\ a_2(e_2^2-1) - a_1(e_1^2-1) \qquad \text{Equation 19}$$

The cos(a+b) terms may be expanded:

$$a_2e_1(e_2^2-1)(\cos\Theta\cos\Phi_1-\sin\Theta\sin\Phi_1) - a_1e_2(e_1^2-1)(\cos\Theta\cos\Phi_2-\sin\Theta\sin\Phi_2) = a_2(e_2^2-1) - a_1(e_1^2-1) \qquad \text{Equation 20}$$

The cos( ) and sin( ) terms may be grouped:

$$\cos\Theta[a_2e_1(e_2^2-1)\cos\Phi_1 - a_1e_2(e_1^2-1)\cos\Phi_2] + \sin\Theta[-a_2e_1(e_2^2-1)\sin\Phi_1 + a_1e_2(e_1^2-1)\sin\Phi_2] = \\ a_2(e_2^2-1) - a_1(e_1^2-1) \qquad \text{Equation 21}$$

The equation may be simplified by declaring (known) terms:

$$k_1 = [a_2 e_1(e_2^2 - 1)\cos\phi_1 - a_1 e_2(e_1^2 - 1)\cos\phi_2] \quad \text{Equation 22}$$

$$k_2 = [-a_2 e_1(e_2^2 - 1)\sin\phi_1 + a_1 e_2(e_1^2 - 1)\sin\phi_2] \quad \text{Equation 23}$$

$$k_3 = [a_2(e_2^2 - 1) - a_1(e_1^2 - 1)] \quad \text{Equation 24}$$

$$k_1 \cos\Theta + k_2 \sin\Theta = \left(\sqrt{k_1^2 + k_2^2}\right)\cos\left(\Theta - \text{Atan}\left(\frac{k_2}{k_1}\right)\right) \quad \text{Equation 25}$$

$$\sqrt{k_1^2 + k_2^2} \cos\left(\Theta - \text{Atan}\left(\frac{k_2}{k_1}\right)\right) = k_3 \quad \text{Equation 26}$$

$$\cos\left(\Theta - \text{Atan}\left(\frac{k_2}{k_1}\right)\right) = \frac{k_3}{\sqrt{k_1^2 + k_2^2}} \quad \text{Equation 27}$$

$$\Theta - \text{Atan}\left(\frac{k_2}{k_1}\right) = \text{Acos}\left(\frac{k_3}{\sqrt{k_1^2 + k_2^2}}\right) \quad \text{Equation 28}$$

$$\Theta = \text{Acos}\left(\frac{k_3}{\sqrt{k_1^2 + k_2^2}}\right) + \text{Atan}\left(\frac{k_2}{k_1}\right) \quad \text{Equation 29}$$

Either of the hyperbola equations may be substituted:

$$r = \frac{a_1(e_1^2 - 1)}{1 - e_1\cos(\Theta + \phi_1)} \quad \text{Equation 30}$$

The sign of the diff term may be left in to get the full range of solutions, and test for reasonableness at the end. Four thetas may be obtained:

$$\Theta = A\text{ COS}(k\_3/\text{SQRT}(k\_1^2 + k\_2^2)) - A\text{ TAN}(k\_2/k\_1) \text{ and } \Theta = A\text{ COS}(-k\_3/\text{SQRT}(k\_1^2 + k\_2^2)) - A\text{ TAN}(k\_2/k\_1) \quad \text{Equation 31}$$

Each of these thetas+π may be computed and substituted into the two equations for AP1 and AP2 to determine if the answers are equal. If so, the equation solves to an intersection. A check may be performed whether the sign of the diff term is correct.

Figure 12:
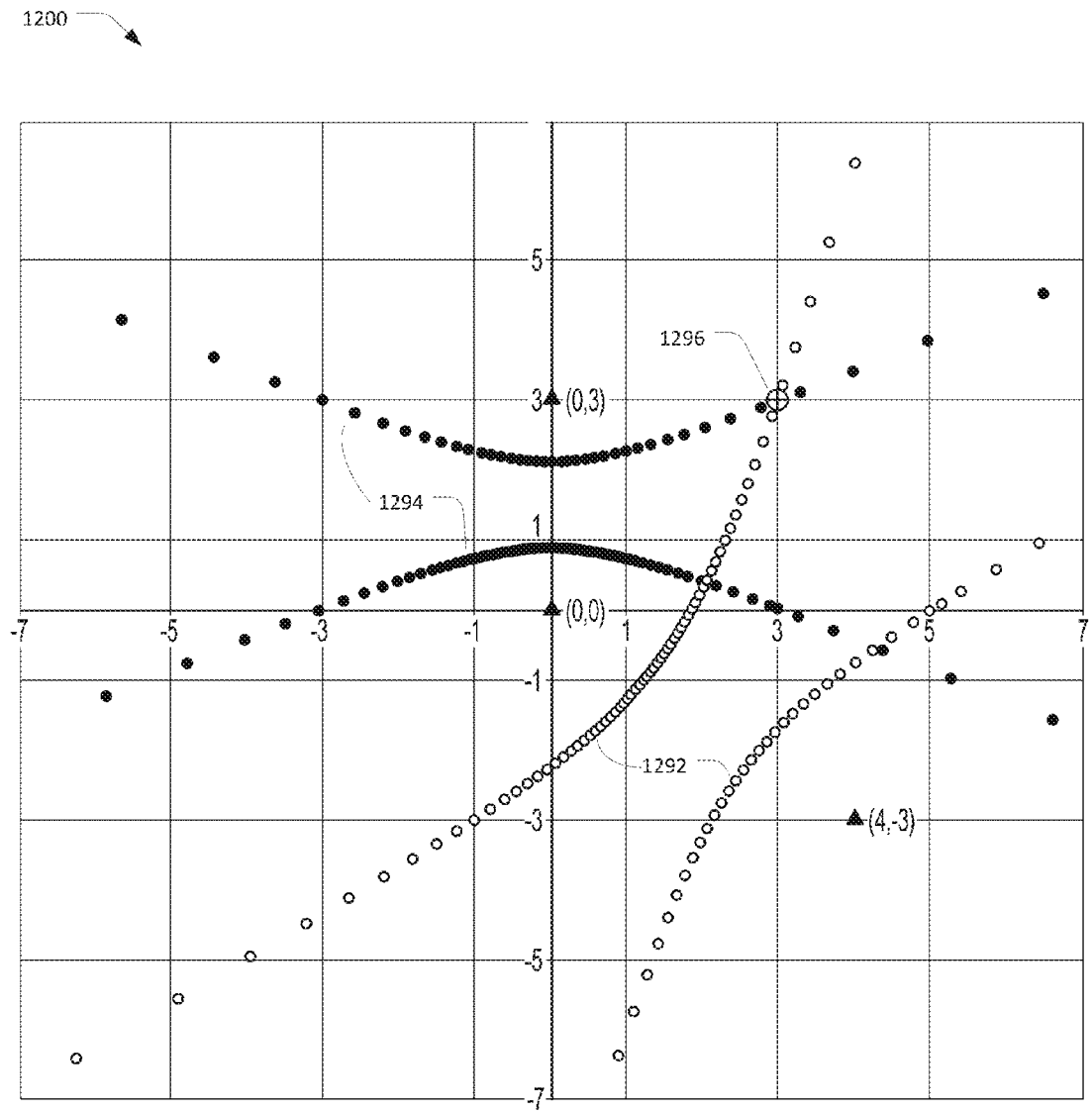
FIG. 12 illustrates a graph including two hyperbola, generated from timestamp data collected from two access points within a network, used to determine the location of a wireless device, according to embodiments of the present technology.

FIG. 12 illustrates a graph including two hyperbola, generated from timestamp data collected from two access points within a network, used to determine the location of a wireless device, according to embodiments of the present technology. FIG. 12 illustrates the solving of the hyperbolas for a location of the wireless device, as shown mathematically with respect to FIG. 11. Hyperbola 1292 indicate a first set of possible locations of a target wireless device as computed based on data collected by access points at locations (4,−3) and (0,0). For example, the access points at locations (4,−3) and (0,0) may correspond to access points 322 and 324 in FIGS. 3-6, respectively, or access points 722 and 724 in FIGS. 7-9, respectively. Hyperbola 1294 indicate a second set of possible locations of a target wireless device as computed based on data collected by access points at locations (0,0) and (0,3). For example, the access points at locations (0,0) and (0,3) may correspond to access points 324 and 326, respectively, or access points 724 and 726, respectively. The estimated location 1296 of the target wireless device (for example, client device 302) is determined by identifying the intersection of the first set of possible locations and the second set of possible locations.

Figure 13:
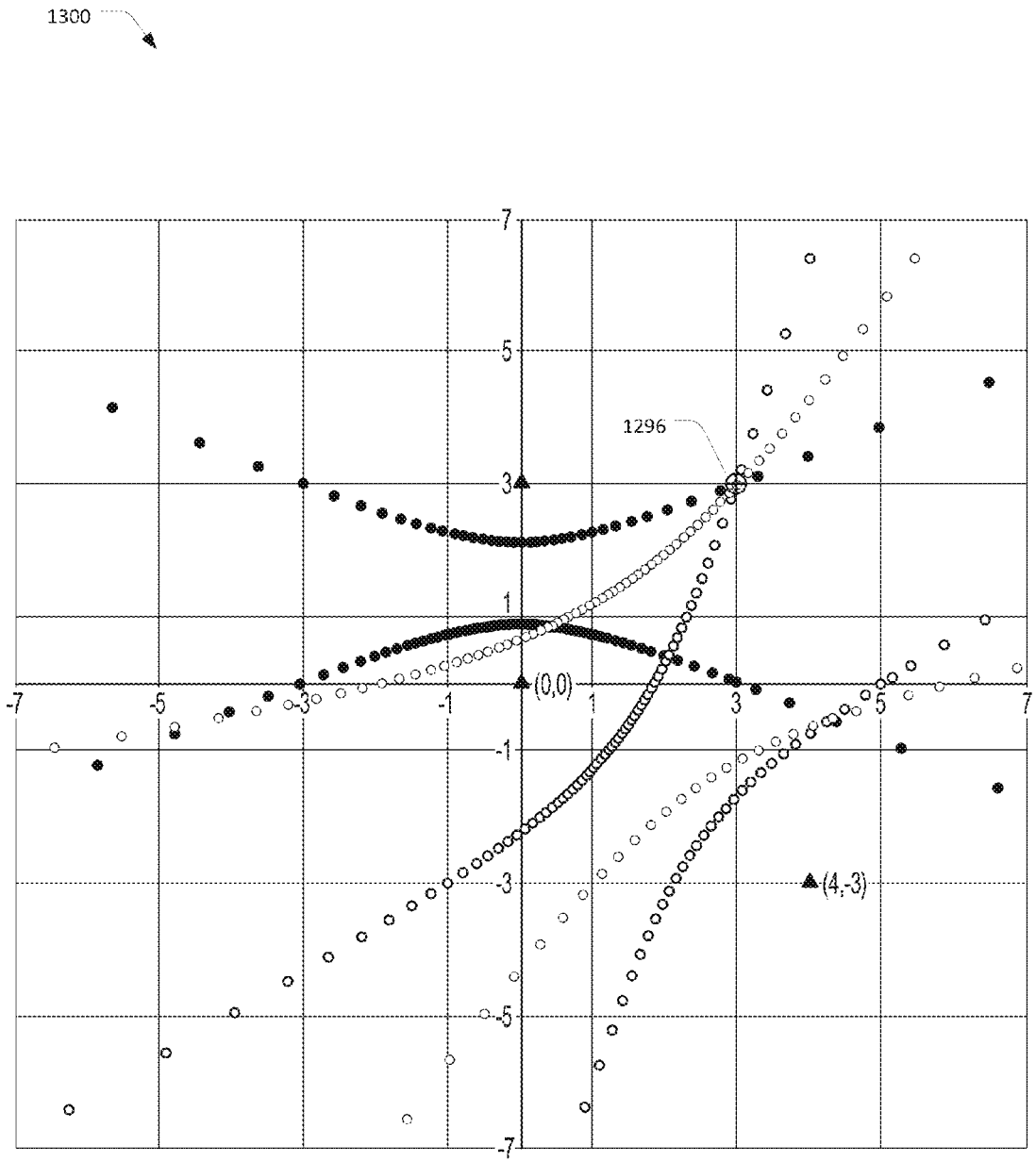
FIG. 13 illustrates a graph including two hyperbola, generated from timestamp data collected from three access points within a network, used to determine the location of a wireless device, according to embodiments of the present technology.

In other embodiments, additional sets of possible locations of the target wireless device may be computed using data collected by other access points within the network that includes the target device. For example, a third set of possible locations of the target wireless device (not shown) may be computed based on data collected by another pair of access points at locations (4,−3) and (0,3). The estimated location 1296 of the target wireless device may be determined by identifying the intersection of the first set of possible locations, the second set of possible locations, and the third set of possible locations. The accuracy of estimating the location of the target wireless device may generally increase when additional data sets corresponding to additional access points are used as part of the location determination. Any number of access points may be used. For example, FIG. 13 illustrates a graph including two hyperbola, generated from timestamp data collected from three access points within a network, used to determine the location of a wireless device, according to embodiments of the present technology. The estimated location of the target device may be determined in a similar way to in FIG. 12, for example by determining the intersection of the three sets of locations, or location 1398.

Other location determination techniques may be used in conjunction with the techniques described herein. For example, techniques such as signal strength of received signals, round trip time, angle of arrival, among others.

Figure 14:
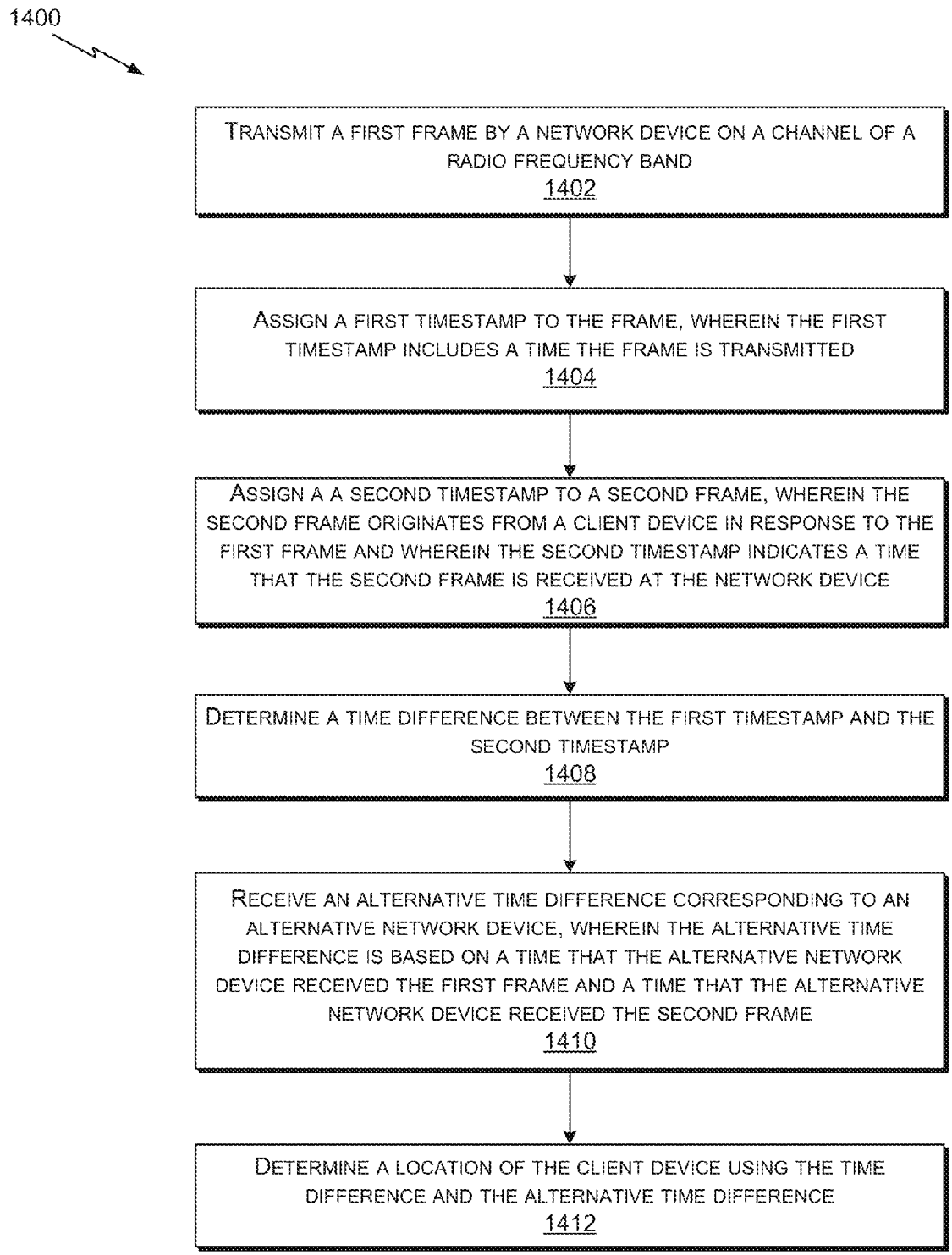
FIG. 14 is a flow chart showing an example process for determining a location of a target wireless device, according to embodiments of the present technology.

FIG. 14 is a flow chart 1400 showing an example process for determining a location of a target wireless device, according to embodiments of the present technology. In step 1402, a network device may transmit a first frame on a channel of a radio frequency band. In step 1404, the network device may assign a first timestamp to the frame, wherein the first timestamp includes a time the frame is transmitted. In step 1406, the network device may assign a second timestamp to a second frame, wherein the second frame originates from a client device in response to the first frame and wherein the second timestamp indicates a time that the second frame is received at the network device. In step 1408, the network device may determine a time difference between the first timestamp and the second timestamp. In step 1410, the network device may receive an alternative time difference corresponding to an alternative network device, wherein the alternative time difference is based on a time that the alternative network device received the first frame and a time that the alternative network device received the second frame. In step 1412, the network device may determine a location of the client device using the time difference and the alternative time difference.

Figure 15:
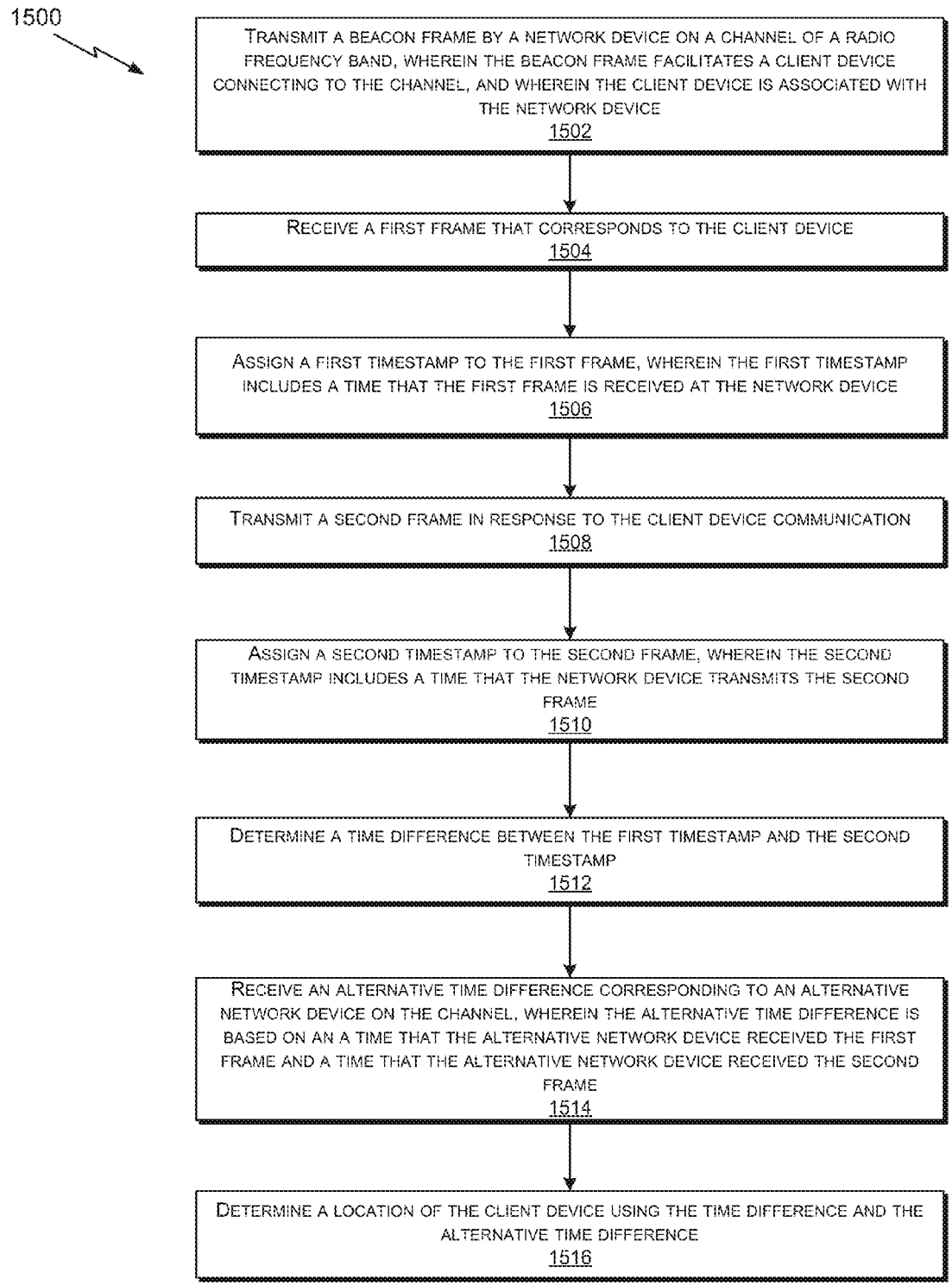
FIG. 15 is a flow chart showing an example process for determining a location of a target wireless device, according to embodiments of the present technology.

FIG. 15 is a flow chart 1500 showing an example process for determining a location of a target wireless device, according to embodiments of the present technology. In step 1502, the network device may transmit a beacon frame by a network device on a channel of a radio frequency band, wherein the beacon frame facilitates a client device connecting to the channel, and wherein the client device is associated with the network device. In step 1504, the network device may receive a first frame that corresponds to the client device. In step 1506, the network device may assign a first timestamp to the first frame, wherein the first timestamp includes a time that the first frame is received at the network device. In step 1508, the network device may transmit a second frame in response to the client device communication. In step 1510, the network device may assign a second timestamp to the second frame, wherein the second timestamp includes a time that the network device transmits the second frame. In step 1512, the network device may determine a time difference between the first timestamp and the second timestamp. In step 1514, the network device may receive an alternative time difference corresponding to an alternative network device on the channel, wherein the alternative time difference is based on an a time that the alternative network device received the first frame and a time that the alternative network device received the second frame. In step 1516, the network device may determine a location of the client device using the time difference and the alternative time difference.

Figure 16:
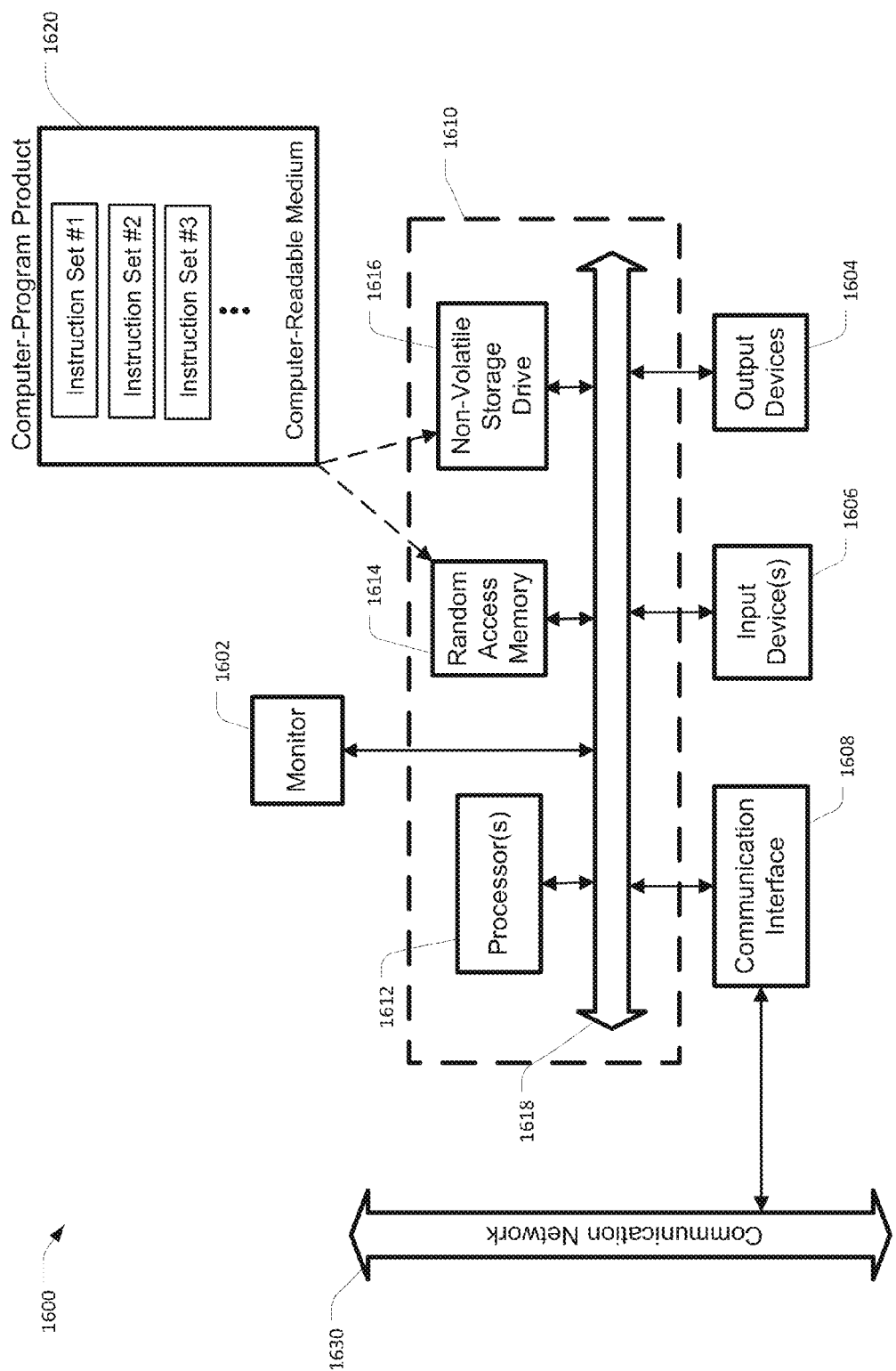
FIG. 16 illustrates an embodiment of a special-purpose computer system, according to embodiments of the present technology.

FIG. 16 illustrates an embodiment of a network device 1600. The above methods may be implemented by computer-program products that direct a network device to perform the actions of the above-described methods and components. Each such computer-program product may comprise sets of instructions (code or program code) embodied on a computer-readable medium that directs the processor of a computer system to perform corresponding actions. The instructions may be configured to run in sequential order, or in parallel (such as under different processing threads), or in a combination thereof.

The network device 1600 comprises a processing system 1610, an optional monitor 1602 coupled to the processing system 1610, one or more optional user output devices 1604 coupled to the processing system 1610, one or more optional user input devices 1606 (e.g., keyboard, mouse, track ball, touch screen) coupled to the processing system 1610, an optional communications interface 1608 coupled to the processing system 1610, a computer-program product 1620 stored in a tangible computer-readable memory in the processing system 1610. The computer-program product 1620 directs the network device 1600 to perform the above-described methods. The processing system 1610 may include one or more processors 1612 that communicate with a number of peripheral devices via a bus subsystem 1618. These peripheral devices may include the user output device(s) 1604, user input device(s) 1606, communications interface 1608, and a storage subsystem, such as a random access memory (RAM) 1614 and/or a non-volatile storage drive 1616 (e.g., disk drive, optical drive, solid state drive), which are forms of tangible computer-readable memory.

The computer-program product 1620 may be stored in the non-volatile storage drive 1616 and/or another computer-readable medium accessible to the processing system 1610 and loaded into the memory 1614. Each processor 1612 may comprise a microprocessor, such as a microprocessor from Intel® or Advanced Micro Devices, Inc.®, or the like. To support the computer-program product 1620, the processing system 1610 runs an operating system that handles the communications of the computer-program product 1620 with the above-noted components, as well as the communications between the above-noted components in support of the computer-program product 1620. Exemplary operating systems include ArubaOS from Aruba Networks, Windows® or the like from Microsoft Corporation, Solaris® from Sun Microsystems, LINUX, UNIX, and the like, and/or device- or system-specific operating systems and the like.

The user input devices 1606 may include a keyboard, a keypad, a mouse, a scanner, a digital drawing pad, a touch screen incorporated into the display, audio input devices such as voice recognition systems, microphones, and other types of input devices. In various embodiments, the user input devices 1606 are typically embodied as a computer mouse, a trackball, a track pad, a joystick, wireless remote, a drawing tablet, or a voice command system. The user input devices 1606 typically allow a user to select objects, icons, text and the like that appear on the monitor 1602 via a command such as a click of a button or the like. The user output devices 1604 include devices and mechanisms to output information from the processing system 1610. These may include a display (e.g., a monitor 1602), printers, non-visual displays such as audio output devices, etc.

The communications interface 1608 provides an interface to communication networks 1630 and devices and may serve as an interface to receive data from and transmit data to other systems, WANs and/or the Internet. Embodiments of the communications interface 1608 may be an Ethernet card, a modem, a cable modem, a router, a switch, an embedded multimedia adapter (EMTA), a synchronous or asynchronous digital subscriber line (DSL) unit, a FireWire® interface, a USB® interface, a wireless network adapter, and the like. For example, the communications interface 1608 may be coupled to a computer network, to a FireWire® bus, or the like. In other embodiments, the communications interface 1608 may be physically integrated on a board of the processing system 1610, and/or may be a software program, or the like.

The RAM 1614 and non-volatile storage drive 1616 are examples of tangible computer-readable media configured to store data such as computer-program product embodiments of the systems and methods described herein, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. The RAM 1614 and non-volatile storage drive 1616 may be configured to store the basic programming and data constructs that provide the functionality of various embodiments of the systems and methods described above.

Software instruction sets that provide the functionality of the described methods may be stored in the RAM 1614 and/or non-volatile storage drive 1616. These instruction sets or code may be executed by the processor(s) 1612. The RAM 1614 and/or non-volatile storage drive 1616 may also provide a repository to store data and data structures used in accordance with the disclosed systems and methods. The RAM 1614 and non-volatile storage drive 1616 may include a number of memories including a main random access memory (RAM) to store instructions and data during program execution and a read-only memory (ROM) in which fixed instructions are stored. The RAM 1614 and non-volatile storage drive 1616 may include a file storage subsystem providing persistent (non-volatile) storage of program and/or data files. The RAM 1614 and non-volatile storage drive 1616 may also include removable storage systems, such as removable flash memory.

The bus subsystem 1618 provides a mechanism to allow the various components and subsystems of the computer 1610 to communicate with each other as intended. Although the bus subsystem 1618 is shown schematically as a single bus, alternative embodiments of the bus subsystem 1618 may implement multiple busses or communication paths within the computer 1610.

The preceding description provides example embodiments only, and is not intended to limit the scope, applicability, or configuration of the disclosure. Rather, the preceding description of the example embodiments will provide those skilled in the art with an enabling description for implementing an example embodiment. It should be understood that various changes may be made in the function and arrangement of elements without departing from the spirit and scope of the systems and methods as set forth in the appended claims.

Specific details are given in the preceding description to provide a thorough understanding of the embodiments. It will be understood, however, by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive.

It is also noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the various systems and methods are described with reference to specific embodiments thereof, but those skilled in the art will recognize that the disclosed systems and methods are not limited thereto. Various features and aspects of the above-described systems and methods may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
   transmitting a beacon frame by a network device on a channel of a radio frequency band, wherein the beacon frame facilitates a client device connecting to the channel, and wherein the client device is associated with the network device;
   receiving a first frame that corresponds to the client device;
   assigning a first timestamp to the first frame, wherein the first timestamp includes a time that the first frame is received at the network device;
   transmitting a second frame to an access point in response to the client device communication;
   assigning a second timestamp to the second frame, wherein the second timestamp includes a time that the network device transmits the second frame; determining a time difference between the first timestamp and the second timestamp;
   receiving an alternative time difference corresponding to the access point on the channel, wherein the alternative time difference is based on a time that the access point received the first frame and a time that the access point received the second frame; and
   determining a location of the client device using the time difference and the alternative time difference.

2. The method of claim 1, further comprising:
   receiving a second alternative time difference corresponding to a second alternative access point on the channel, wherein the second alternative time difference is based on a time that the second access point receives the first frame and a time that the second access point receives the second frame; and
   determining a location of the client device using the time difference, the alternative time difference, and the second alternative time difference.

3. The method of claim 1, further comprising:
   transmitting, by the network device, channel information corresponding to the channel, wherein the channel information facilitates the access point connecting to the channel.

4. The method of claim 1, further comprising:
   determining that the network device and the access point are connected to the same channel.

5. The method of claim 1, wherein the client device is in sleep mode, and
   transmitting the beacon frame facilitates removing the client device from sleep mode.

6. The method of claim 1, further comprising:
   transmitting a location query including the time difference and the alternative time difference; and
   receiving a response to the location query including a location of the client device.

7. The method of claim 1, wherein the first frame includes an indication that the client device is connected to the channel.

8. A network device, comprising:
   one or more processors;
   a non-transitory computer-readable medium containing instructions that, when executed by the one or more processors, cause the one or more processors to perform operations including:
   receiving a first frame that corresponds to the client device;
   assigning a first timestamp to the first frame, wherein the first timestamp includes a time that the first frame is received at the network device;
   transmitting, to an access point, a second frame in response to the client device communication;
   assigning a second timestamp to the second frame, wherein the second timestamp includes a time that the network device transmits the second frame;
   determining a time difference between the first timestamp and the second timestamp;
   receiving an alternative time difference corresponding to the access point on the channel, wherein the alternative time difference is based on an a time that the access point received the first frame and a time that the access point received the second frame; and
   determining a location of the client device using the time difference and the alternative time difference.

9. The network device of claim 8, further comprising instructions that, when executed by the one or more processors, cause the one or more processors to perform operations including:

receiving a second alternative time difference corresponding to a second access point on the channel, wherein the second alternative time difference is based on a time that the second access point receives the first frame and a time that the second access point receives the second frame; and determining a location of the client device using the time difference, the alternative time difference, and the second alternative time difference.

10. The network device of claim 8, further comprising instructions that, when executed by the one or more processors, cause the one or more processors to perform operations including:

transmitting, by the network device, channel information corresponding to the channel, wherein the channel information facilitates the access point connecting to the channel.

11. The network device of claim 8, further comprising instructions that, when executed by the one or more processors, cause the one or more processors to perform operations including:

determining that the network device and the access point are connected to the same channel.

12. The network device of claim 8, wherein the client device is in sleep mode, and transmitting the beacon frame facilitates removing the client device from sleep mode.

13. The network device of claim 8, further comprising instructions that, when executed by the one or more processors, cause the one or more processors to perform operations including:

transmitting a location query including the time difference and the alternative time difference; and receiving a response to the location query including a location of the client device.

14. The network device of claim 8, wherein the first frame includes an indication that the client device is connected to the channel.

15. A computer-program product tangibly embodied in a non-transitory machine-readable storage medium of a computing device, including instructions that, when executed by one or more processors, cause the one or more processors to:

receive a first frame that corresponds to the client device;

assign a first timestamp to the first frame, wherein the first timestamp includes a time that the first frame is received at the network device;

transmit, to an access point, a second frame in response to the client device communication;

assign a second timestamp to the second frame, wherein the second timestamp includes a time that the network device transmits the second frame;

determine a time difference between the first timestamp and the second timestamp;

receive an alternative time difference corresponding to the access point on the channel, wherein the alternative time difference is based on an a time that the access point received the first frame and a time that the access point received the second frame; and determine a location of the client device using the time difference and the alternative time difference.

* * * * *